US012703215B2

(12) United States Patent
Ellifson et al.

(10) Patent No.: US 12,703,215 B2
(45) Date of Patent: Aug. 11, 2026

(54) SYSTEMS AND METHODS FOR VEHICLE SUSPENSION ASSEMBLIES

(71) Applicant: Oshkosh Corporation, Oshkosh, WI (US)

(72) Inventors: Erik S. Ellifson, Oshkosh, WI (US); Christopher Yakes, Oshkosh, WI (US); Colin Wheeler, Oshkosh, WI (US); Jeremy Andringa, Oshkosh, WI (US); Ryan Wolf, Oshkosh, WI (US); Martin J. Schimke, Red Granite, WI (US); Chad Smith, Omro, WI (US); Peter Kramer, Oshkosh, WI (US); Nader Nasr, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/891,381

(22) Filed: Sep. 20, 2024

(65) Prior Publication Data

US 2025/0010675 A1 Jan. 9, 2025

Related U.S. Application Data

(63) Continuation of application No. 17/939,297, filed on Sep. 7, 2022, now Pat. No. 12,122,212.

(60) Provisional application No. 63/242,302, filed on Sep. 9, 2021.

(51) Int. Cl.

| | |
|---|---|
| ***B60G 7/00*** | (2006.01) |
| ***B60G 13/00*** | (2006.01) |
| ***B60G 21/00*** | (2006.01) |
| *B60L 50/60* | (2019.01) |

(52) U.S. Cl.
CPC ........... *B60G 7/008* (2013.01); *B60G 13/005* (2013.01); *B60G 21/005* (2013.01); *B60L 50/60* (2019.02)

(58) Field of Classification Search
CPC .... B60G 7/008; B60G 13/005; B60G 21/005; B60L 50/60
See application file for complete search history.

(56) References Cited

U.S. PATENT DOCUMENTS

| | | | | |
|---|---|---|---|---|
| 8,387,999 | B2 | 3/2013 | Li et al. | |
| 8,695,746 | B2 | 4/2014 | Holroyd et al. | |
| 8,746,713 | B2 | 6/2014 | Meitinger et al. | |
| 10,214,068 | B2 | 2/2019 | Langhorst et al. | |
| 11,858,342 | B2 * | 1/2024 | Auer .................... | B60K 7/0007 |

(Continued)

FOREIGN PATENT DOCUMENTS

| | | | | |
|---|---|---|---|---|
| DE | 102017004205 A1 * | 1/2018 | .............. | B60K 1/00 |
| WO | WO-2021/156642 A1 | 8/2021 | | |

OTHER PUBLICATIONS

DE102017004205A1 Machine English Translation (Year: 2018).*

*Primary Examiner* — Jason D Shanske
*Assistant Examiner* — Matthew James O'Neill
(74) *Attorney, Agent, or Firm* — Foley & Lardner LLP

(57) ABSTRACT

An electrified vehicle includes a chassis having a frame member, a tractive element, a suspension assembly having a support linkage pivotally coupled to the frame member so that the support linkage is configured to pivot about a pivot point, and an axle assembly coupled to the tractive element and supported on the support linkage. The axle assembly includes an axle and an electric motor that is oriented so that the electric motor extends in a direction toward the pivot point.

20 Claims, 17 Drawing Sheets

(56) References Cited

U.S. PATENT DOCUMENTS

2004/0256186 A1 12/2004 Farewell
2006/0049600 A1* 3/2006 Dudding .................. B60G 9/00 280/124.11
2006/0113743 A1 6/2006 Bryant
2009/0033044 A1 2/2009 Linsmeier
2012/0049470 A1 3/2012 Rositch et al.
2012/0098215 A1 4/2012 Rositch et al.
2012/0234638 A1 9/2012 Ellifson et al.
2013/0249175 A1 9/2013 Ellifson
2013/0249183 A1 9/2013 Ellifson et al.
2013/0264784 A1 10/2013 Venton-Walters et al.
2013/0300073 A1 11/2013 Venton-Walters et al.
2014/0251742 A1 9/2014 Dillman et al.
2014/0291945 A1 10/2014 Venton-Walters et al.
2014/0326555 A1 11/2014 Ellifson et al.
2014/0334956 A1 11/2014 Venton-Walters et al.
2015/0028529 A1 1/2015 Ellifson
2015/0108732 A1 4/2015 Luttinen et al.
2015/0197129 A1 7/2015 Venton-Walters et al.
2015/0290993 A1 10/2015 Dillman et al.
2015/0377314 A1 12/2015 Ellifson et al.
2016/0167475 A1 6/2016 Ellifson et al.
2016/0208883 A1 7/2016 Dillman et al.
2017/0282670 A1 10/2017 Venton-Walters et al.
2018/0003258 A1 1/2018 Ellifson et al.
2018/0056746 A1 3/2018 Ellifson et al.
2018/0201081 A1* 7/2018 Holtheide ............ B60G 21/051
2018/0229569 A1 8/2018 Dillman et al.
2018/0335104 A1 11/2018 Dillman et al.
2019/0178329 A1 6/2019 Dumitru et al.
2019/0308480 A1 10/2019 Dillman et al.
2019/0316650 A1 10/2019 Dillman et al.
2019/0337348 A1 11/2019 Venton-Walters et al.
2019/0337350 A1 11/2019 Ellifson et al.
2019/0338823 A1 11/2019 Ellifson et al.
2019/0366834 A1 12/2019 Nagpal et al.
2020/0094639 A1 3/2020 Tiramani et al.
2020/0223276 A1 7/2020 Rositch et al.
2020/0232533 A1 7/2020 Dillman et al.
2020/0254840 A1 8/2020 Rositch et al.
2021/0008948 A1 1/2021 Kirar
2021/0088036 A1 3/2021 Schubart et al.
2021/0155063 A1 5/2021 Rositch et al.
2021/0229515 A1 7/2021 Dillman et al.
2021/0252977 A1* 8/2021 Engerman ................ B60K 1/00
2021/0276643 A1 9/2021 Ellifson et al.
2021/0394576 A1 12/2021 Venton-Walters et al.
2021/0394578 A1 12/2021 Ellifson et al.
2021/0396293 A1 12/2021 Ellifson et al.
2022/0065322 A1 3/2022 Dumitru et al.
2022/0134834 A1 5/2022 Venton-Walters et al.
2022/0170528 A1 6/2022 Dillman et al.
2022/0258556 A1 8/2022 Rositch et al.
2022/0307566 A1 9/2022 Ellifson et al.
2022/0307567 A1 9/2022 Dillman et al.

* cited by examiner 10
2210
30
2218
2214
2216
2224
X
2212
2226
2228
2222
Z
X
Y 10
2210
2216
30
2218
2224
2214
2230
X
2212
2226
2228
2222
2232
Z
X
Y

SYSTEMS AND METHODS FOR VEHICLE SUSPENSION ASSEMBLIES

CROSS-REFERENCE TO RELATED PATENT APPLICATIONS

This application is a continuation of U.S. patent application Ser. No. 17/939,297, filed on Sep. 7, 2022, which claims the benefit of and priority to U.S. Provisional Patent Application No. 63/242,302, filed on Sep. 9, 2021, each of which is hereby incorporated by reference herein.

BACKGROUND

The present disclosure relates generally to vehicles. More specifically, the present disclosure relates to a vehicle including a chassis. A chassis typically includes one or more frame components that support the other structures of the vehicle (e.g., a cab, a body, an implement, etc.). The chassis may include tractive elements coupled the frame that engage a support surface (e.g., the ground) to support the vehicle. The chassis may be coupled to components, such as a body or an implement, that are specific to a desired application of the vehicle. The chassis may also be coupled to components of a suspension system. Suspension systems traditionally couple components of the chassis to one or more axles. This may include solid axle suspension systems, independent suspension systems, axle-mounted motor suspension systems, among others.

SUMMARY

One exemplary embodiment relates to an electrified vehicle, comprising a chassis having a frame, a first tractive element, and a first suspension system coupled with the first tractive element and the chassis. The first suspension system may comprise a first knuckle coupled with the first tractive element, and a first strut-damper coupled with the first knuckle and the chassis, the first strut-damper extending between the chassis and the first knuckle. The first suspension system may also include a first control arm coupled with the first knuckle and the frame member, and a torsion bar coupled with the chassis at a first end of the torsion bar. The torsion bar may extend in a direction substantially parallel with the frame member, where the torsion bar may be configured to support a portion of a mass of the electrified vehicle in response to displacement of the first tractive element relative to the chassis.

Another exemplary embodiment relates to an electrified vehicle, comprising a chassis having a frame member, the frame member configured to support a portion of a load of the electrified vehicle. The electrified vehicle may also include a first suspension assembly coupled with the chassis and a first tractive element. The first suspension assembly may include a first knuckle coupled with the first tractive element and a first strut-damper coupled with the first knuckle and the chassis, the first strut-damper extending between the chassis and the first knuckle. The first suspension assembly may also include a first control arm coupled with the first knuckle and the frame member, and a torsion bar coupled with the chassis at a first end of the torsion bar. The torsion bar may extend in a direction substantially parallel with the frame member, where the torsion bar may be configured to supplement the frame member to support a portion of the load of the electrified vehicle.

Another exemplary embodiment relates to an electrified vehicle, comprising a chassis having a frame member, and a battery supported by the chassis. The electrified vehicle may also include a suspension system coupled with the chassis and a tractive element, the suspension system comprising a knuckle coupled with the tractive element, and a strut-damper coupled with the knuckle and the chassis, the strut-damper extending between the chassis and the knuckle. The suspension system may also include a control arm coupled with the knuckle and the frame member and a torsion bar coupled with the chassis at a first end of the torsion bar. The torsion bar may extend in a direction substantially parallel with the frame member, where the torsion bar may be configured to support a portion of a mass of the battery.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an electric vehicle includes a suspension system that is configured to provide increased space between components of the chassis, reduce stress on components of the vehicle, and/or provide additional support and suspension capabilities to the vehicle. In an exemplary embodiment, the suspension system includes a shock absorber that is smaller (e.g., in diameter, narrower, etc.) than components of traditional suspension system. The suspension system may be configured to provide additional lateral and/or longitudinal space between components of the chassis, and/or permit a plurality of suspension systems to be positioned adjacent to one another. In some embodiments, the suspension system includes an actuator, and the suspension system is configured to reduce the effective suspension inertia caused by the actuator and/or other components of the vehicle. In this regard, the suspension system may provide additional suspension performance and/or reduced stress (e.g., force, load, weight, etc.) on the actuator and/or other components of the vehicle compared to traditional suspension systems. In other embodiments, the suspension system includes an axle, and the suspension system is configured to be positioned longitudinally on the chassis and/or selectively deploy the axle so as to provide additional space between components of the chassis and/or provided additional suspension and support to the vehicle.

Figure 1:
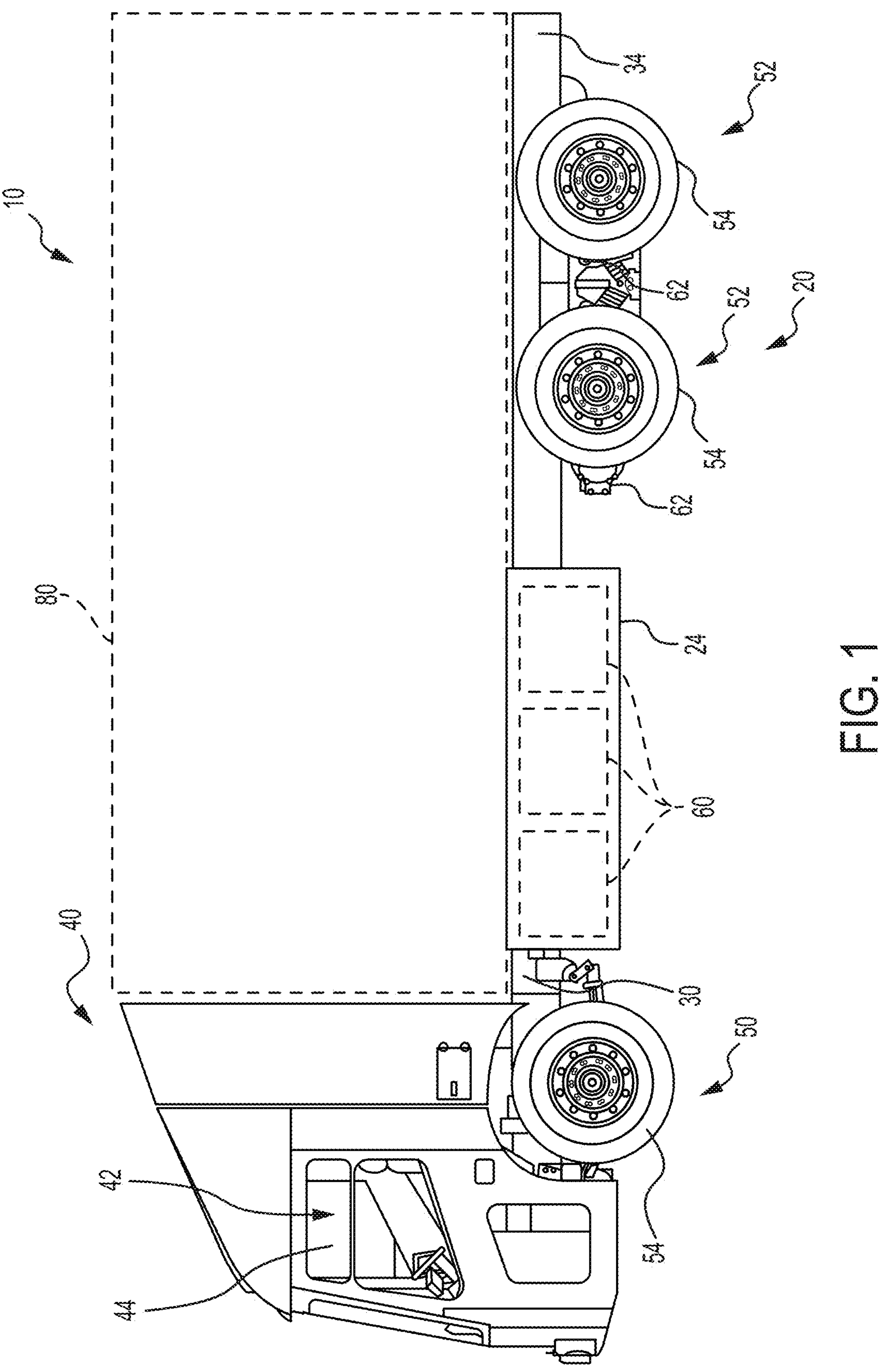
FIG. 1 is a left side view of a vehicle, according to an exemplary embodiment.
Figure 2:
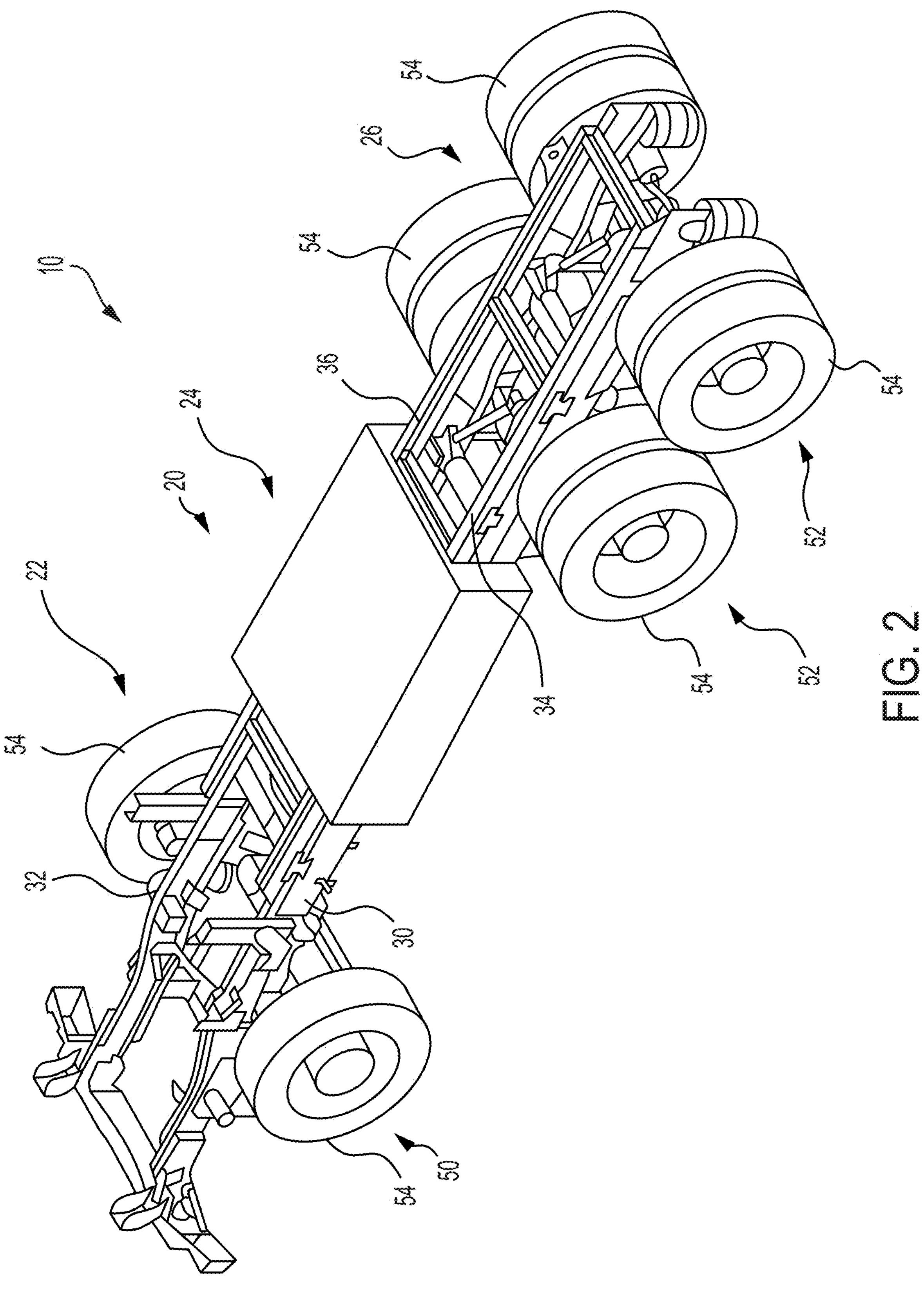
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20 that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42 that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a plurality of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10. As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-8 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

Figure 3:
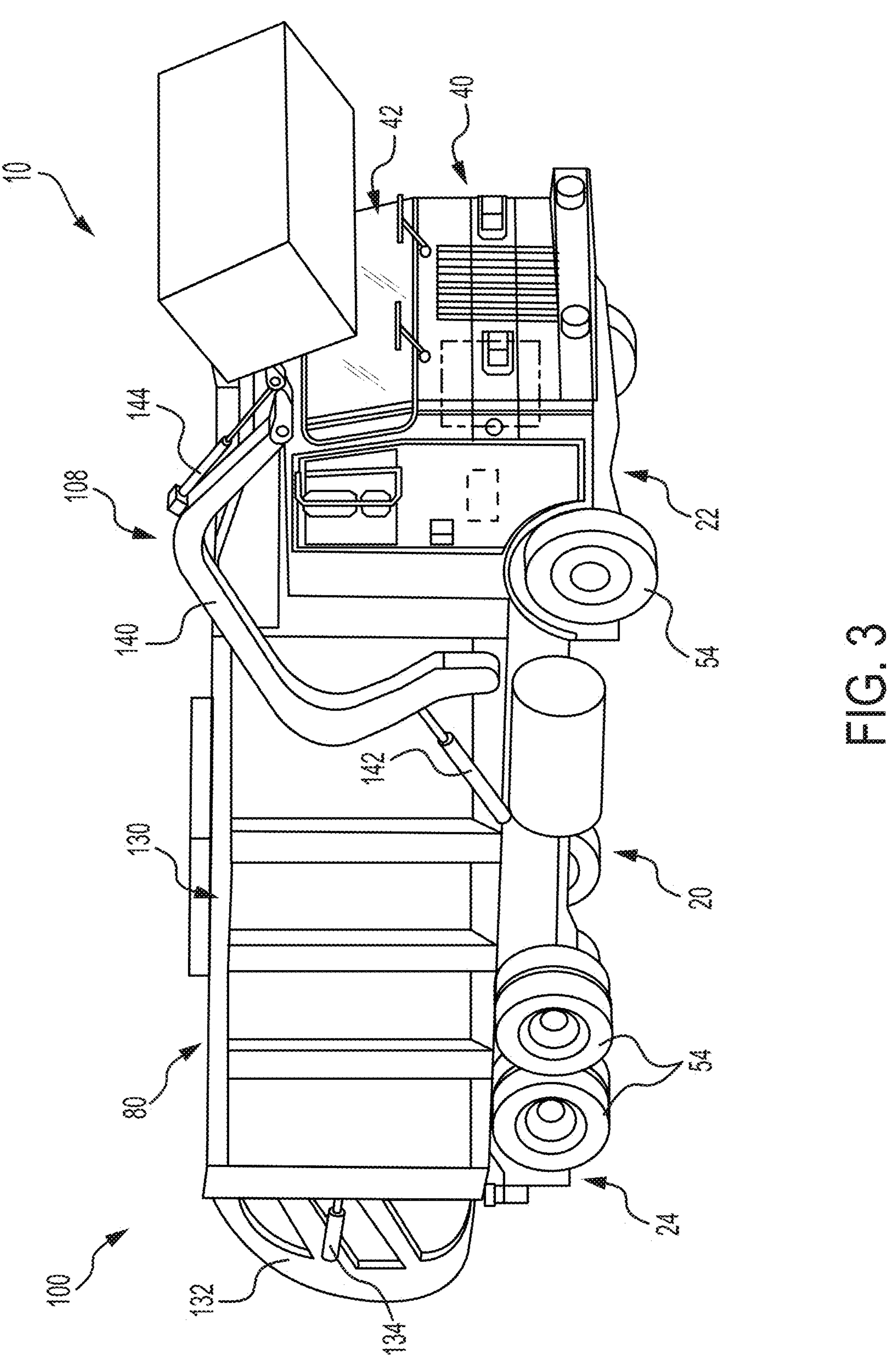
FIG. 3 is a perspective view of the vehicle of FIG. 1 configured as a refuse vehicle, according to an exemplary embodiment.

Referring now to FIG. 3, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a side-loading refuse vehicle.

As shown in FIG. 3, the application kit 80 of the refuse vehicle 100 includes a rear body or container, shown as refuse compartment 130, and a pivotable rear portion, shown as tailgate 132. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted. The refuse compartment 130 may also provide temporary storage for refuse during transport to a waste disposal site and/or a recycling facility. In some embodiments, the refuse compartment 130 includes a hopper volume and storage volume. In this regard, refuse may be initially loaded into the hopper volume and later compacted into the storage volume. According to an exemplary embodiment, the hopper volume is positioned between the storage volume and the cab 40 (e.g., refuse is loaded into a position of the refuse compartment 130 behind the cab 40 and stored in a position further toward the rear of the refuse compartment 130). In other embodiments, the storage volume is positioned between the hopper volume and the cab 40 (e.g., in a rear-loading refuse truck, etc.). The tailgate 132 may be pivotally coupled to the refuse compartment 130, and may be movable between a closed position and an open position by an actuator (e.g., a hydraulic cylinder, an electric linear actuator, etc.), shown as tailgate actuator 134 (e.g., to facilitate emptying the storage volume).

As shown in FIG. 3, the refuse vehicle 100 also includes an implement, shown as lift assembly 108 (e.g., a front-loading lift assembly, etc.). According to an exemplary embodiment, the lift assembly 108 includes a pair of lift arms 140, lift arm actuators 142, and articulation actuators 144. The lift arms 140 may be rotatably coupled to the chassis 20 and/or the refuse compartment 130 on each side of the refuse vehicle 100 (e.g., through a pivot, a lug, a shaft, etc.), such that the lift assembly 108 may extend forward relative to the cab 40 (e.g., a front-loading refuse truck, etc.). In other embodiments, the lift assembly 108 is configured to extend rearward relative to the application kit 80 (e.g., a rear-loading refuse truck). In yet other embodiments, the lift assembly 108 is configured to extend from a side of the application kit 80 (e.g., a side-loading refuse truck). As shown in FIG. 3, in an exemplary embodiment the lift arm actuators 142 are positioned such that extension and retraction of the lift arm actuators 142 rotates the lift arms 140 about an axis extending through the pivot. In this regard, the lift arms 140 may be rotated by the lift arm actuators 142 to lift a refuse container over the cab 40. In an exemplary embodiment, the articulation actuators 144 are positioned to articulate the distal end of the lift arms 140 (e.g., a portion of the lift arms 140 that may be coupled to the refuse container), in order to assist in tipping refuse out of the refuse container and into the refuse compartment 130. The lift arm actuators 142 may then rotate the lift arms 140 to return the empty refuse container to the ground.

Figure 4:
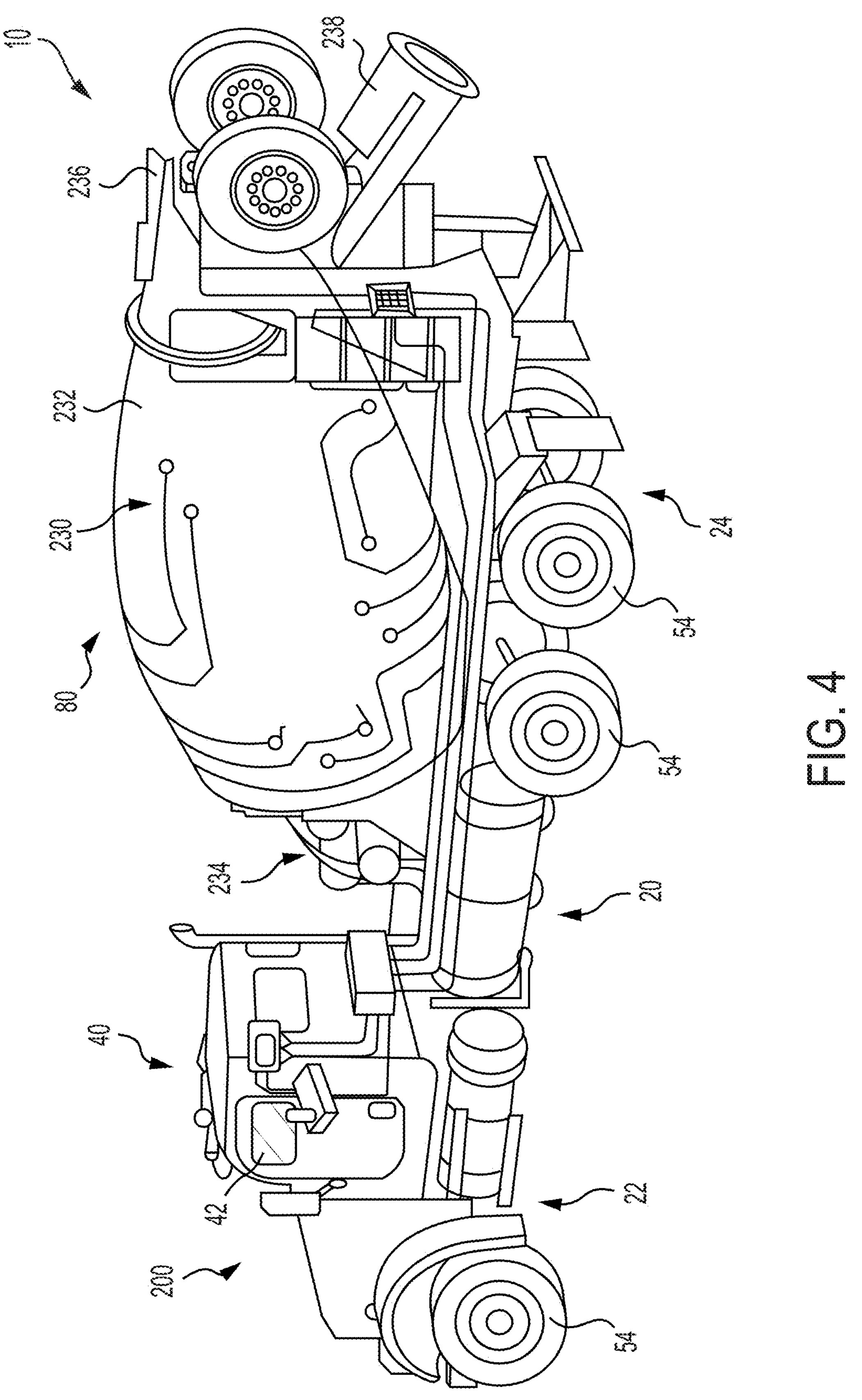
FIG. 4 is a perspective view of the vehicle of FIG. 1 configured as a mixer vehicle, according to an exemplary embodiment.

Referring now to FIG. 4, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 4, the application kit 80 includes a mixing drum assembly (e.g., a concrete mixing drum), shown as drum assembly 230. The drum assembly 230 may include a mixing drum 232, a drum drive system 234 (e.g., a rotational actuator or motor), an inlet, shown as hopper 236, and an outlet, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 is elevated from the chassis 20 (e.g., from a horizontal plan extending along the chassis 20) at an angle in the range of five degrees to twenty degrees. In other embodiments, the central, longitudinal axis is elevated by less than five degrees (e.g., four degrees, etc.). In yet another embodiment, the mixer truck 200 includes an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) are positioned in the interior of the mixing drum 232, and are configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 also includes an actuator positioned such that the chute 238 is selectively pivotable to position the chute 238 (e.g., vertically, laterally, etc.), for example at an angle at which the mixture is expelled from the mixing drum 232.

Figure 5:
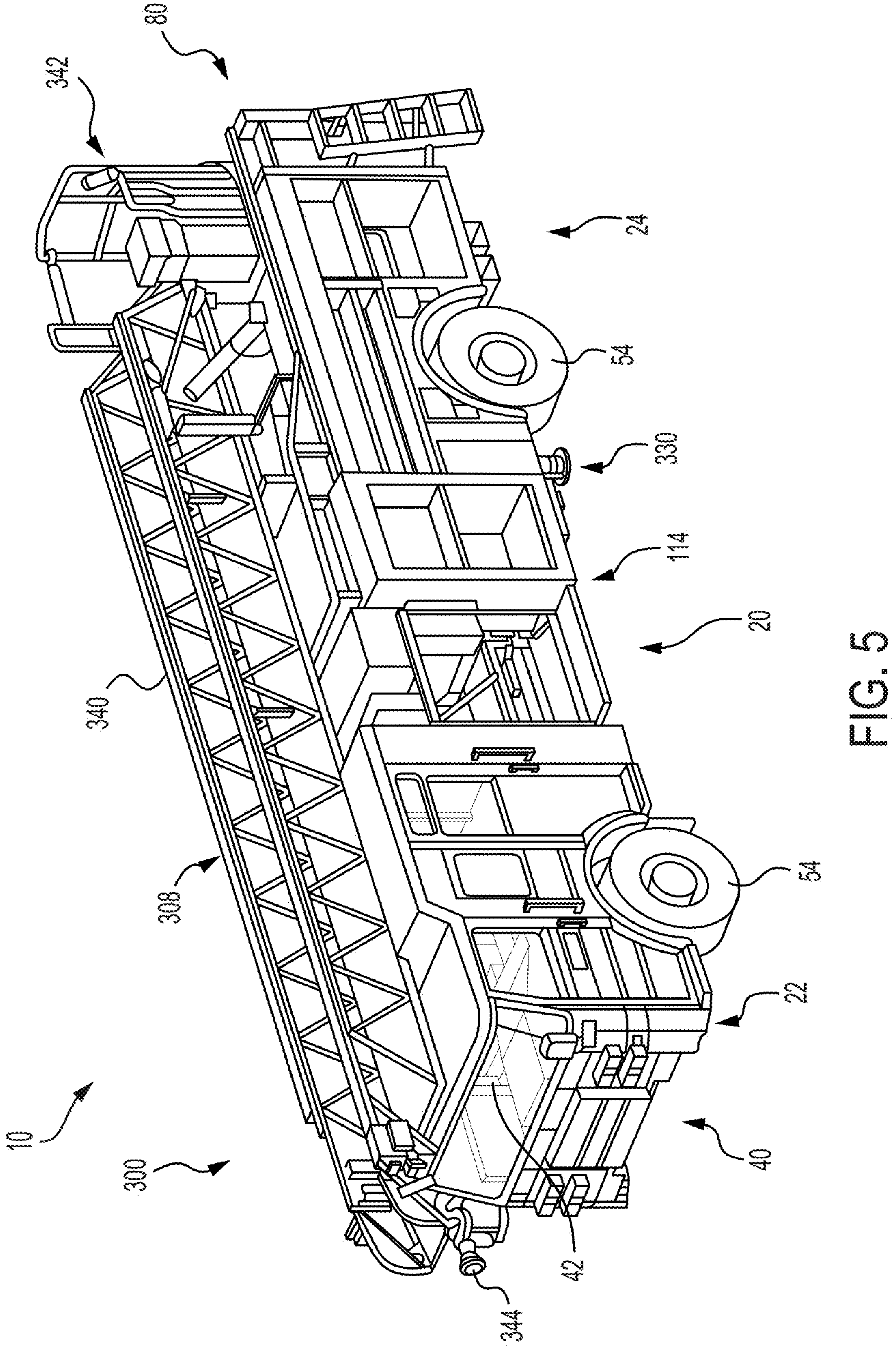
FIG. 5 is a perspective view of the vehicle of FIG. 1 configured as a fire fighting vehicle, according to an exemplary embodiment.

Referring now to FIG. 5, the vehicle 10 is configured as a fire fighting vehicle or fire apparatus (e.g., a turntable ladder truck, a pumper truck, a quint, etc.), shown as fire fighting vehicle 300. In the embodiment shown in FIG. 5, the fire fighting vehicle 300 is configured as a rear-mount aerial ladder truck. In other embodiments, the fire fighting vehicle 300 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 5, in the fire fighting vehicle 300, the application kit 80 is positioned mainly rearward from the cab 40. The application kit 80 includes deployable stabilizers (e.g., outriggers, downriggers, etc.), shown as outriggers 330, that are coupled to the chassis 20. The outriggers 330 may be configured to selectively extend from each lateral side and/or the rear of the fire fighting vehicle 300 and engage a support surface (e.g., the ground) in order to provide increased stability while the fire fighting vehicle 300 is stationary. This increased stability is desirable when the ladder assembly 308 is in use (e.g., extended from the fire fighting vehicle 300) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 5, the application kit 80 includes a ladder assembly 308 coupled to the chassis 20. The ladder assembly 308 includes a series of ladder sections 340 that are slidably coupled with one another such that the ladder sections 340 may extend and/or retract (e.g., telescope) relative to one another to selectively vary a length of the ladder assembly 308. A base platform, shown as turntable 342, is rotatably coupled to the chassis 20 and to a proximal end of a base ladder section 340 (i.e., the most proximal of the ladder sections 340). The turntable 342 may be configured to rotate about a vertical axis relative to the chassis 20 to rotate the ladder sections 340 about the vertical axis (e.g., up to 360 degrees, etc.). The ladder sections 340 may rotate relative to the turntable 342 about a substantially horizontal axis to selectively raise and lower the ladder sections 340 relative to the chassis 20. As shown, a water turret or implement, shown as monitor 344, is coupled to a distal end of a fly ladder section 340 (i.e., the most distal of the ladder sections 340). The monitor 344 may be configured to expel water and/or a fire suppressing agent (e.g., foam, etc.) from a water storage tank and/or an agent tank onboard the fire fighting vehicle 300, and/or from an external source (e.g., a fire hydrant, a separate water/pumper truck, etc.). In some embodiments, the ladder assembly 308 further includes an aerial platform coupled to the distal end of the fly ladder section 340 and configured to support one or more operators.

Figure 6:
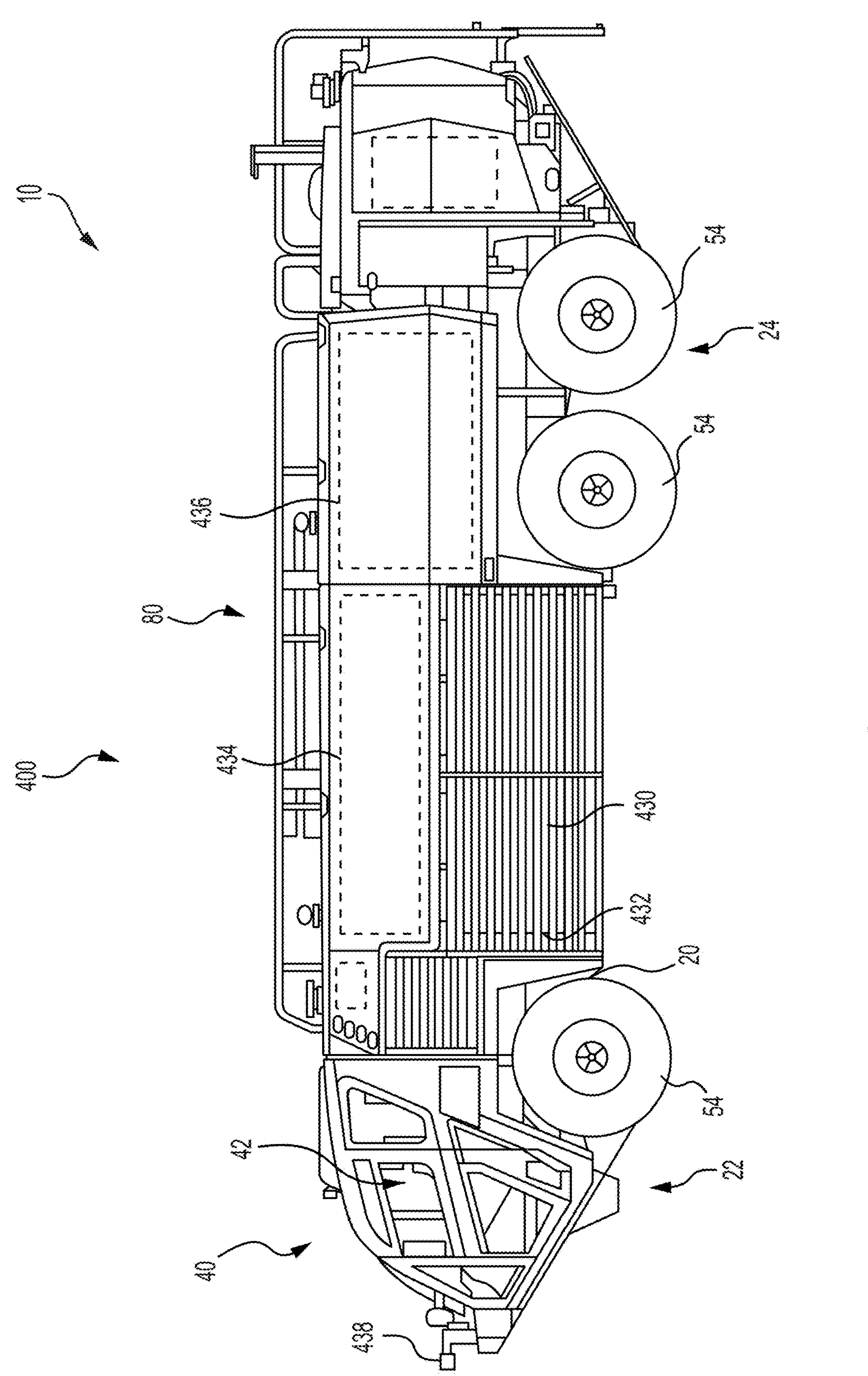
FIG. 6 is a left side view of the vehicle of FIG. 1 configured as an airport fire fighting vehicle, according to an exemplary embodiment.

Referring now to FIG. 6, the vehicle 10 is configured as a fire fighting vehicle, shown as airport rescue and fire fighting (ARFF) truck 400. As shown in FIG. 6, the application kit 80 is positioned primarily rearward of the cab 40. As shown, the application kit 80 includes a series of storage compartments or cabinets, shown as compartments 430 that are coupled to the chassis 20. The compartments 430 may store various equipment or components of the ARFF truck 400.

The application kit 80 includes a pump system 432 (e.g., an ultra-high-pressure pump system, etc.) positioned within one of the compartments 430 near the center of the ARFF truck 400. The application kit 80 further includes a water tank 434, an agent tank 436, and an implement or water turret, shown as monitor 438. The pump system 432 may include a high pressure pump and/or a low pressure pump, which may be fluidly coupled to the water tank 434 and/or the agent tank 436. The pump system 432 may be configured to pump water and/or fire suppressing agent from the water tank 434 and the agent tank 436, respectively, to the monitor 438. The monitor 438 may be selectively reoriented by an operator to adjust a direction of a stream of water and/or agent. As shown in FIG. 6, the monitor 438 is coupled to a front end of the cab 40.

Figure 7:
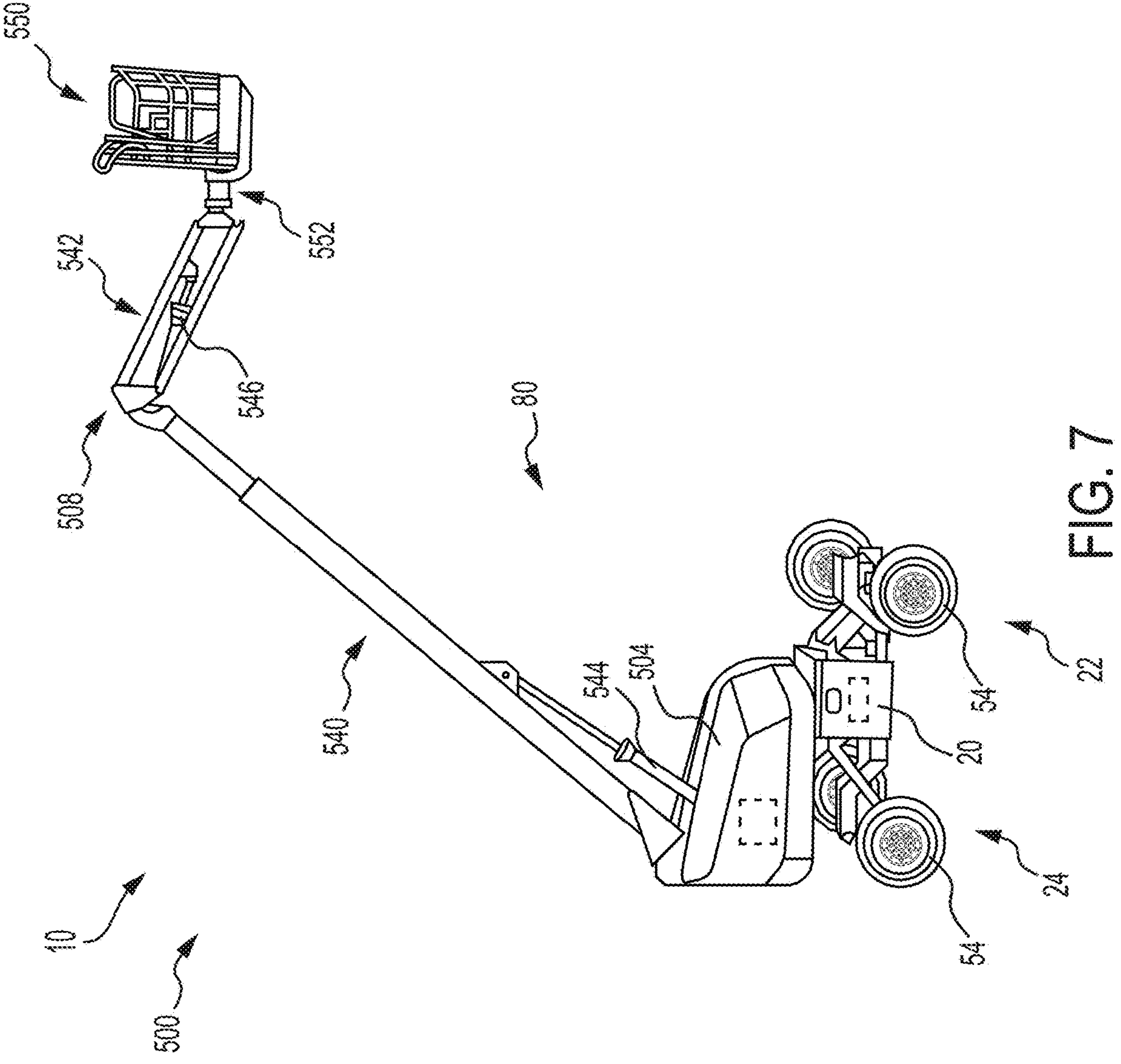
FIG. 7 is a perspective view of the vehicle of FIG. 1 configured as a boom lift, according to an exemplary embodiment.

Referring now to FIG. 7, the vehicle 10 is configured as a lift device, shown as boom lift 500. The boom lift 500 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 7, the application kit 80 includes a base assembly, shown as turntable 504 that is rotatably coupled to the chassis 20. The turntable 504 may be configured to selectively rotate relative to the chassis 20 about a substantially vertical axis. In some embodiments, the turntable 504 includes a counterweight positioned near the rear of the turntable 504. The turntable 504 is rotatably coupled to a lift assembly, shown as boom assembly 508. The boom assembly 508 includes a first section or telescoping boom section, shown as lower boom 540. The lower boom 540 includes a series of nested boom sections that extend and retract (e.g., telescope) relative to one another to vary a length of the boom assembly 508. The boom assembly 508 may further include a second boom section or four bar linkage, shown as upper boom 542. The upper boom 542 may include structural members that rotate relative to one another to raise and lower a distal end of the boom assembly 508. In other embodiments, the boom assembly 508 includes more or fewer boom sections (e.g., one, three, five, etc.) and/or a different arrangement of boom sections.

As shown in FIG. 7, the boom assembly 508 includes a first actuator, shown as lower lift cylinder 544. The lower boom 540 is pivotally coupled (e.g., pinned, etc.) to the turntable 504 at a joint or lower boom pivot point. The lower lift cylinder 544 (e.g., a pneumatic cylinder, an electric actuator, a hydraulic cylinder, etc.) is coupled to the turntable 504 at a first end and coupled to the lower boom 540 at a second end. The lower lift cylinder 544 may be configured to raise and lower the lower boom 540 relative to the turntable 504 about the lower boom pivot point.

The boom assembly 508 further includes a second actuator, shown as upper lift cylinder 546. The upper boom 542 is pivotally coupled (e.g., pinned) to the upper end of the lower boom 540 at a joint or upper boom pivot point. The upper lift cylinder 546 (e.g., a pneumatic cylinder, an electric actuator, a hydraulic cylinder, etc.) is coupled to the upper boom 542. The upper lift cylinder 546 may be configured to extend and retract to actuate (e.g., lift, rotate, elevate, etc.) the upper boom 542, thereby raising and lowering a distal end of the upper boom 542.

Referring still to FIG. 7, the application kit 80 further includes an operator platform, shown as platform assembly 550, coupled to the distal end of the upper boom 542 by an extension arm, shown as jib arm 552. The jib arm 552 may be configured to pivot the platform assembly 550 about a lateral axis (e.g., to move the platform assembly 550 up and down, etc.) and/or about a vertical axis (e.g., to move the platform assembly 550 left and right, etc.).

The platform assembly 550 provides a platform configured to support one or more operators or users. In some embodiments, the platform assembly 550 includes accessories or tools configured for use by the operators. For example, the platform assembly 550 may include pneumatic tools (e.g., an impact wrench, airbrush, nail gun, ratchet, etc.), plasma cutters, welders, spotlights, etc. In some embodiments, the platform assembly 550 includes a control panel (e.g., a user interface, a removable or detachable control panel, etc.) configured to control operation of the boom lift 500 (e.g., the turntable 504, the boom assembly 508, etc.) from the platform assembly 550 or remotely. In other embodiments, the platform assembly 550 is omitted, and the boom lift 500 includes an accessory and/or tool (e.g., forklift forks, etc.) coupled to the distal end of the boom assembly 508.

Figure 8:
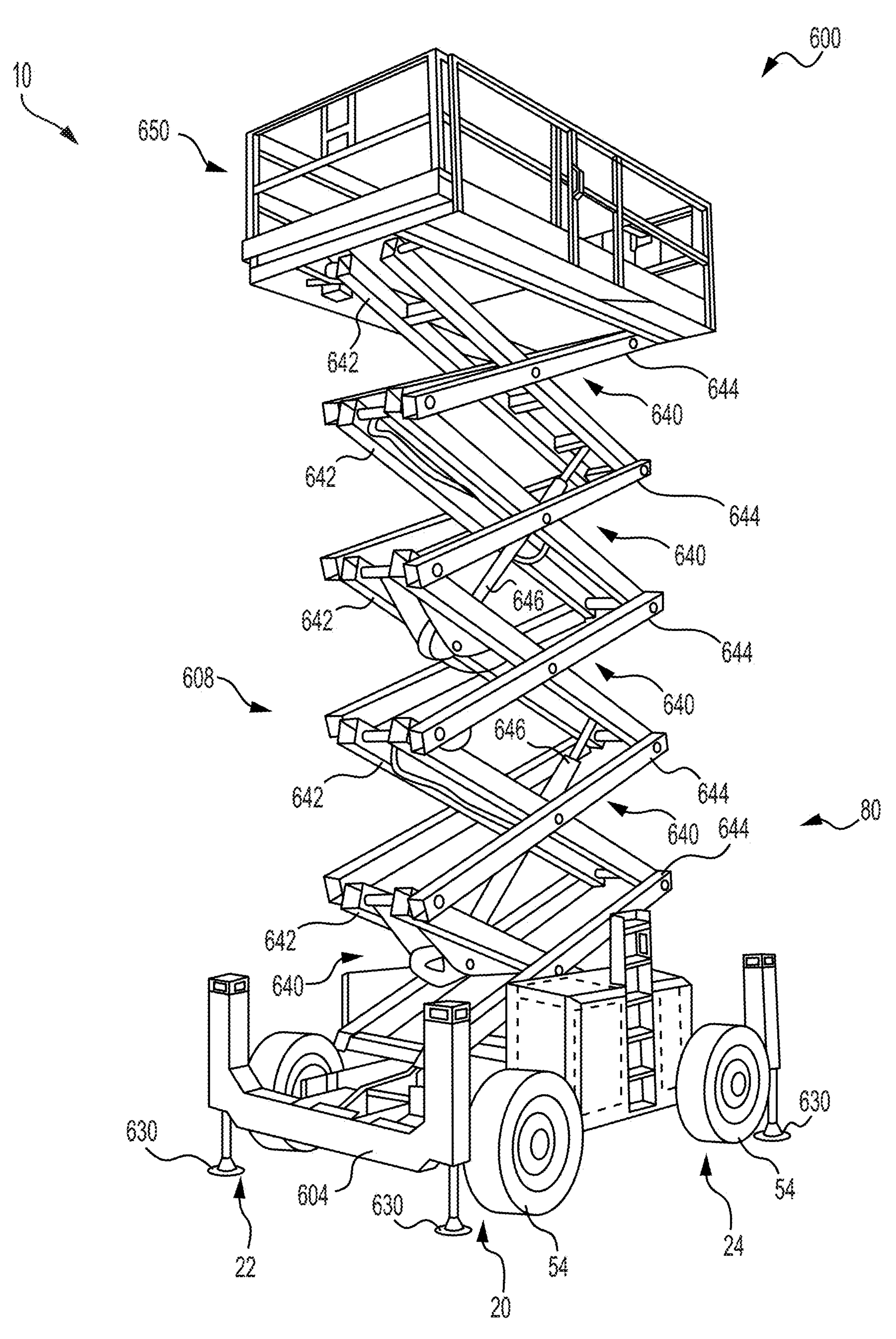
FIG. 8 is a perspective view of the vehicle of FIG. 1 configured as a scissor lift, according to an exemplary embodiment.

Referring now to FIG. 8, the vehicle 10 is configured as a lift device, shown as scissor lift 600. As shown in FIG. 8, the application kit 80 includes a body, shown as lift base 604, coupled to the chassis 20. The lift base 604 is coupled to a scissor assembly, shown as lift assembly 608, such that the lift base 604 supports the lift assembly 608. The lift assembly 608 is configured to extend and retract, raising and lowering between a raised position and a lowered position relative to the lift base 604.

As shown in FIG. 8, the lift base 604 includes a series of actuators, stabilizers, downriggers, or outriggers, shown as leveling actuators 630. The leveling actuators 630 may extend and retract vertically between a stored position and a deployed position. In the stored position, the leveling actuators 630 may be raised, such that the leveling actuators 630 do not contact the ground. Conversely, in the deployed position, the leveling actuators 630 may engage the ground to lift the lift base 604. The length of each of the leveling actuators 630 in their respective deployed positions may be varied in order to adjust the pitch (e.g., rotational position about a lateral axis) and the roll (e.g., rotational position about a longitudinal axis) of the lift base 604 and/or the chassis 20. Accordingly, the lengths of the leveling actuators 630 in their respective deployed positions may be adjusted to level the lift base 604 with respect to the direction of gravity (e.g., on uneven, sloped, pitted, etc. terrain). The leveling actuators 630 may lift the wheel and tire assemblies 54 off of the ground to prevent movement of the scissor lift 600 during operation. In other embodiments, the leveling actuators 630 are omitted.

The lift assembly 608 may include a series of subassemblies, shown as scissor layers 640, each including a pair of inner members 642 and a pair of outer members 644. The scissor layers 640 may be stacked atop one another in order to form the lift assembly 608. The inner members 642 may be pivotally coupled to the outer members 644 near the center of both the inner members 642 and the outer members 644. In this regard, the inner members 642 may pivot relative to the outer members 644 about a lateral axis. Each of the inner members 642 and the outer members 644 may include a top end and a bottom end. The bottom end of each inner member 642 may be pivotally coupled to the top end of the outer member 644 immediately below it, and the bottom end of each outer member 644 may be pivotally coupled to the top end of the inner member immediately below it. Accordingly, each of the scissor layers 640 may be coupled to one another such that movement of one scissor layer 640 causes a similar movement in all of the other scissor layers 640. The bottom ends of the inner member 642 and the outer member 644 that make up the lowermost scissor layer 640 may be coupled to the lift base 604. The top beds of the inner member 642 and the outer member 644 that make up the uppermost scissor layer 640 may be coupled to the platform assembly 650. In some embodiments, scissor layers 640 are added to, or removed from, the lift assembly 608 in order to increase, or decrease, the fully extended height of the lift assembly 608.

Referring still to FIG. 8, the lift assembly 608 may also include one or more lift actuators 646 (e.g., hydraulic cylinders, pneumatic cylinders, motor-driven leadscrews, etc.) configured to extend and retract the lift assembly 608. The lift actuators 646 may be pivotally coupled to an inner member 642 at a first end and pivotally coupled to an inner member 642 of another scissor layer 640 at a second end. In an exemplary embodiment, these inner members 642 belong to a first scissor layer 640 and a second scissor layer 640 (which may be separated by a third scissor layer 640). In other embodiments, the lift actuators 646 are arranged in other configurations (e.g., the first scissor layer 640 and the second scissor layer 640 are not separated by a third scissor layer 640, etc.).

A distal or upper end of the lift assembly 608 may be coupled to an operator platform, shown as platform assembly 650. The lift actuators 646 may be configured to actuate the lift assembly 608 to selectively reposition the platform assembly 650 between a lowered position (e.g., where the platform assembly 650 is proximate to the lift base 604) and a raised position (e.g., where the platform assembly 650 is at an elevated height relative to the lift base 604). Specifically, in some embodiments, extension of the lift actuators 646 moves the platform assembly 650 upward (e.g., extending the lift assembly 608), and retraction of the lift actuators 646 moves the platform assembly 650 downward (e.g., retracting the lift assembly 608). In other embodiments, extension of the lift actuators 646 retracts the lift assembly 608, and retraction of the lift actuators 646 extends the lift assembly 608. In some embodiments, the outer members 644 are parallel to and/or in contact with one another when the lift assembly 608 is in the stored position.

In some embodiments, the platform assembly 650 includes a platform that is configured to support one or more operators or users. Similar to the platform assembly 550, the platform assembly 650 may include accessories or tools (e.g., pneumatic tools, plasma cutters, welders, spotlights, etc.) configured for use by an operator. The platform assembly 650 may include a control panel to control operation of the scissor lift 600.

Figure 9:
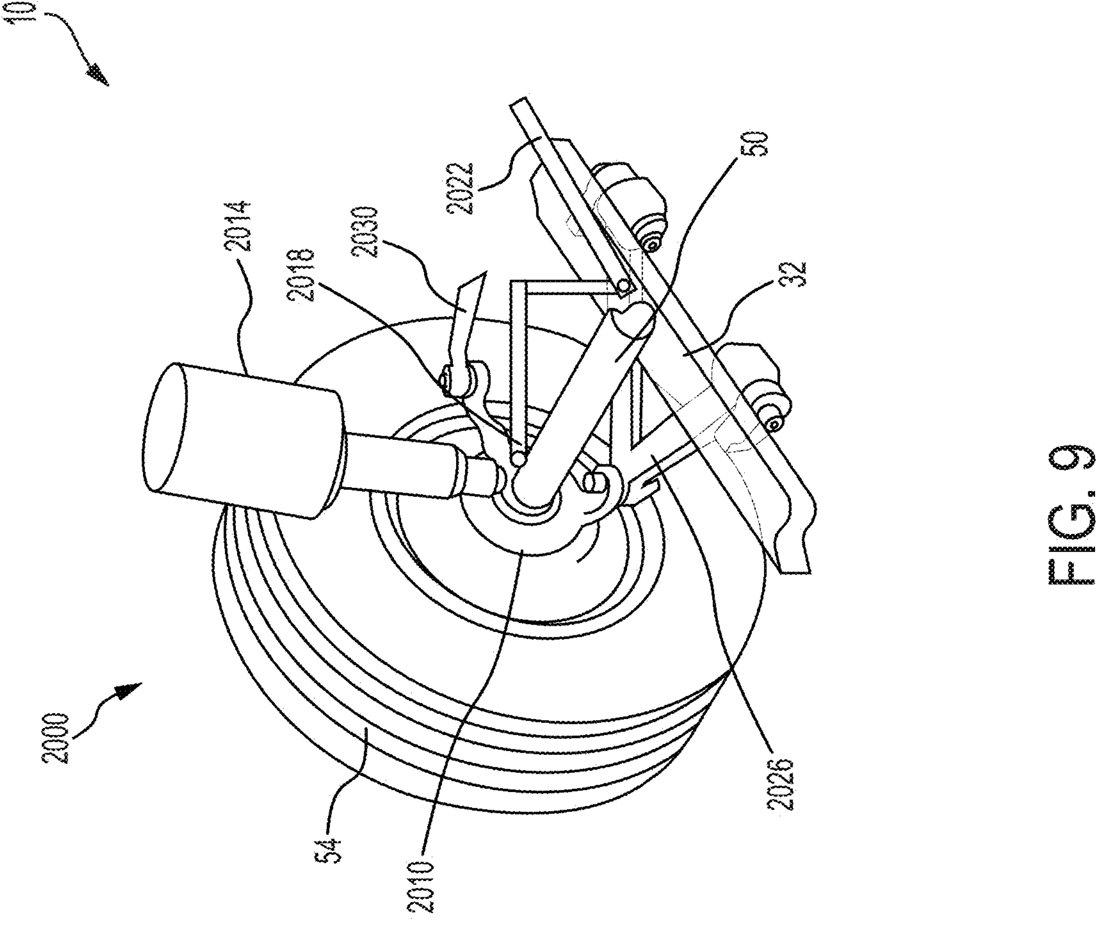
FIG. 9 is a perspective view of a suspension system of the vehicle of FIGS. 1-8, according to an exemplary embodiment.
Figure 10:
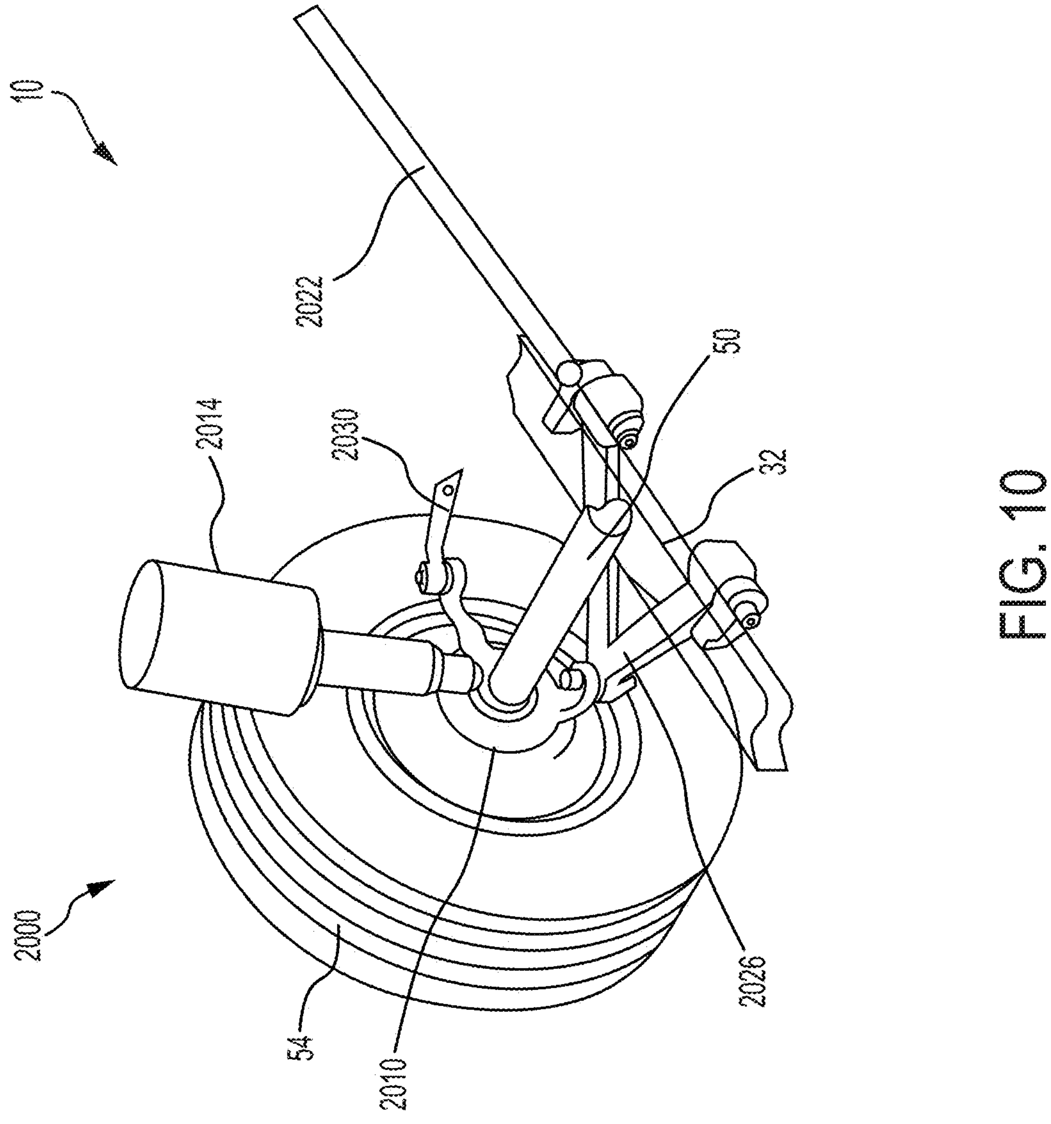
FIG. 10 is a perspective view of a suspension system of the vehicle of FIGS. 1-8, according to another exemplary embodiment.

According to the exemplary embodiments shown in FIGS. 9-10, a suspension system, shown as suspension system 2000, is configured to couple the tractive elements (e.g., wheel and tire assemblies 54) to components of the chassis 20 of the vehicle 10 of FIGS. 1-8. In an exemplary embodiment, the suspension system 2000 couples the tractive elements to the front section 22 (e.g., the front rail portion 30 and/or the front rail portion 32), the rear section 26 (e.g., the rear rail portion 34 and/or the rear rail portion 36), the middle section 24, and/or another component of the vehicle 10. In one embodiment, the suspension system 2000 is configured as a leading-arm suspension system (e.g., where the tractive elements are positioned in front of pivot axes of the suspension systems 2000). In some embodiments, the suspension system 2000 is configured as a trialing-arm suspension system (e.g., where the tractive elements are positioned behind pivot axes of the suspension systems 2000). In other embodiments, the suspension system 2000 is configured as another suitable suspension system. In yet other embodiments, only the front tractive elements are coupled to the front section 22 with the suspension system 2000 and the rear (and/or middle) tractive elements are coupled to the rear section 26 (and/or middle section 24) with another suspension system, or vice versa.

As shown in FIG. 9, the suspension system 2000 includes a steering knuckle, hub, and/or spindle, shown as knuckle 2010, a shock absorber and/or damper, shown as strut-damper 2014, and a linkage, shown as drop link 2018. Further, the suspension system 2000 may also include an elongated spring, shown as torsion bar 2022, a hinged suspension link, shown as lower control arm 2026, and a steering linkage, shown as steering link 2030. In some embodiments, the suspension system 2000 includes additional, fewer, and/or different working components. According to an exemplary embodiment, the suspension system 2000 is a front suspension system (e.g., at the front section 22 of the vehicle 10). In some embodiments, the suspension system 2000 is a rear suspension system (e.g., at the rear section 26 of the vehicle 10). In other embodiments, the suspension system 2000 is another suitable suspension system (e.g., at the middle section 24 of the vehicle 10, at another component of the vehicle 10, etc.). In yet other embodiments, the vehicle 10 includes a plurality of suspension systems 2000, which are front suspension systems, rear suspension systems, and/or other suitable suspension systems (e.g., at the front section 22, the rear section 26, the middle section 24, etc. of the vehicle 10).

As shown in FIGS. 9-10, the knuckle 2010 is coupled to tractive elements and an axle assembly. The knuckle 2010 may be coupled (e.g., fixed, mounted, etc.) to the tractive elements and/or the axle assembly via other components (e.g., a hub and bearing assembly, a clamp/cam bolt, a ball joint, a rod, etc.). As discussed above, the tractive elements may be a wheel and tire assembly (e.g., shown as the wheel and tire assembly 54), or any other suitable tractive elements (e.g., a track assembly, etc.). In an exemplary embodiment, the suspension system 2000 is a front suspension system, and the knuckle 2010 is coupled to a front axle assembly (e.g., shown as the front axle 50). In other embodiments, the suspension system 2000 is a rear suspension system, and the knuckle 2010 is coupled to a rear axle assembly (e.g., the rear axle 52, etc.). In yet other embodiments, the suspension system 2000 is another suspension system, and the knuckle 2010 is coupled to another component of the vehicle 10 (e.g., the middle section 24, etc.).

As shown in FIGS. 9-10, the knuckle 2010 is also coupled to the strut-damper 2014. In an exemplary embodiment, the strut-damper 2014 extends between components of the vehicle 10 (e.g., the front section 22, the rear section 26, the middle section 24, etc.) and the knuckle 2010 (e.g., the wheel and tire assembly 54, etc.), and is configured to absorb shocks, impulses, or sudden forces that are transmitted to the vehicle 10 through the tractive elements (e.g., the wheel and tire assembly 54, etc.). The strut-damper 2014 may be coupled (e.g., fixed, mounted, welded, bolted, etc.) to components of the vehicle and/or the knuckle 2010 via any suitable coupling mechanism (e.g., mounted using ball joints, eyelets, etc., pinned, welded, fastened, etc.). According to an exemplary embodiment, the strut-damper 2014 includes shock absorbing components (e.g., a strut housing, a dampening unit, a piston, a piston rod, hydraulic fluid, etc.), without a spring (e.g., a coil spring, etc.). In this regard, the strut-damper 2014 may be smaller in size (e.g., smaller diameter at a top portion, provide a narrower profile in a lateral and/or longitudinal direction, etc.) than traditional strut systems that include springs, and may be configured to increase the lateral and/or longitudinal space between components of the chassis (e.g., the tractive elements, the front rail portions 30-32 of the front section 22, rear rail portions 34-36 of the rear section 26, components of the middle section 24, etc.). In some embodiments, the strut-damper 2014 includes a spring (e.g., a coil spring, etc.). In other embodiments, the strut-damper 2014 includes extendable/retractable members (e.g., telescoping members, etc.), for example to produce a camber angle (e.g., a neutral camber angle, a positive camber angle, a negative camber angle, etc.) and/or to raise/lower the tractive element (e.g., the wheel and tire assembly 54).

Figure 18:
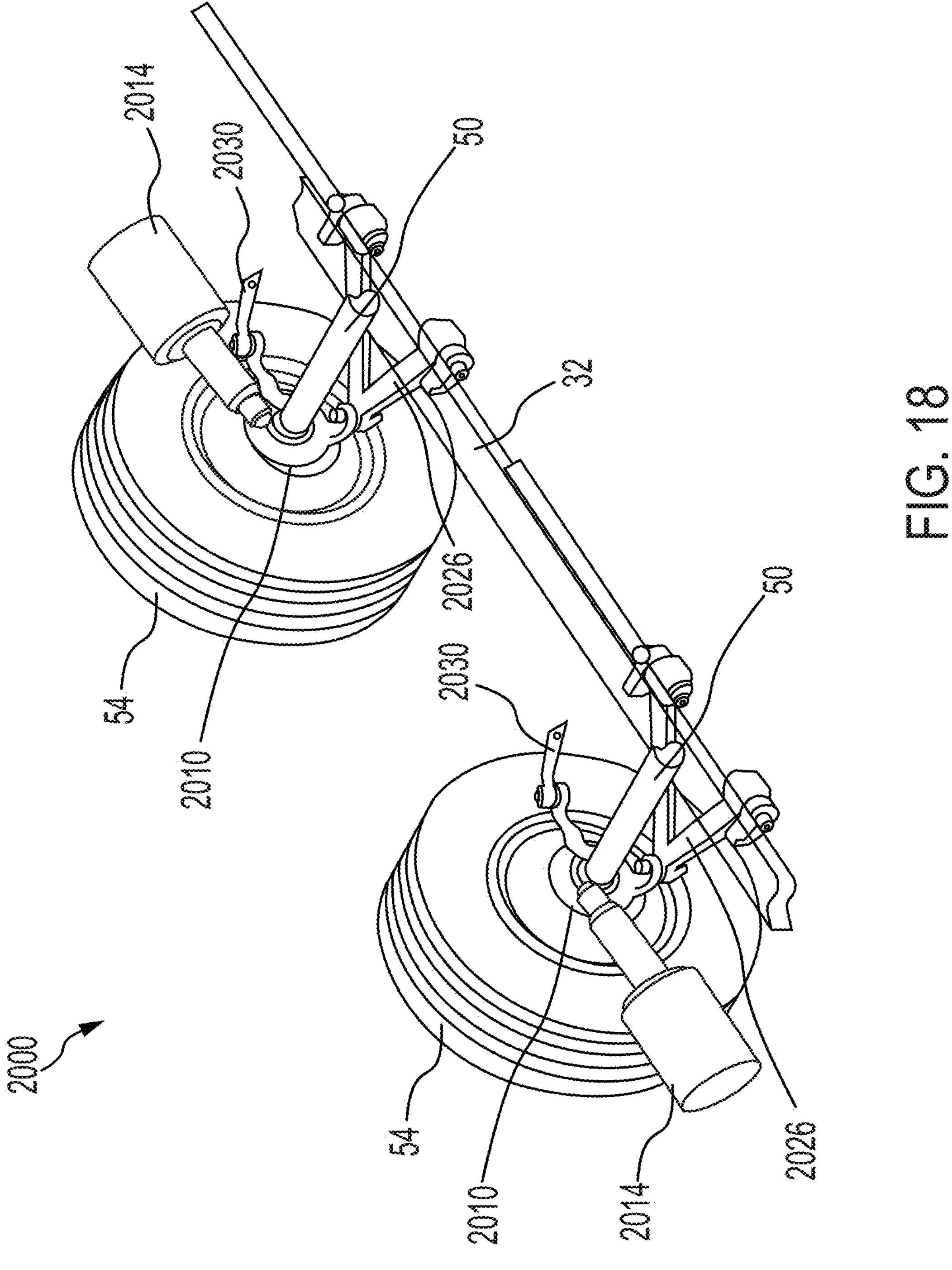
FIG. 18 is a perspective view of a suspension system of the vehicle of FIGS. 1-8, according to an exemplary embodiment.
Figure 19:
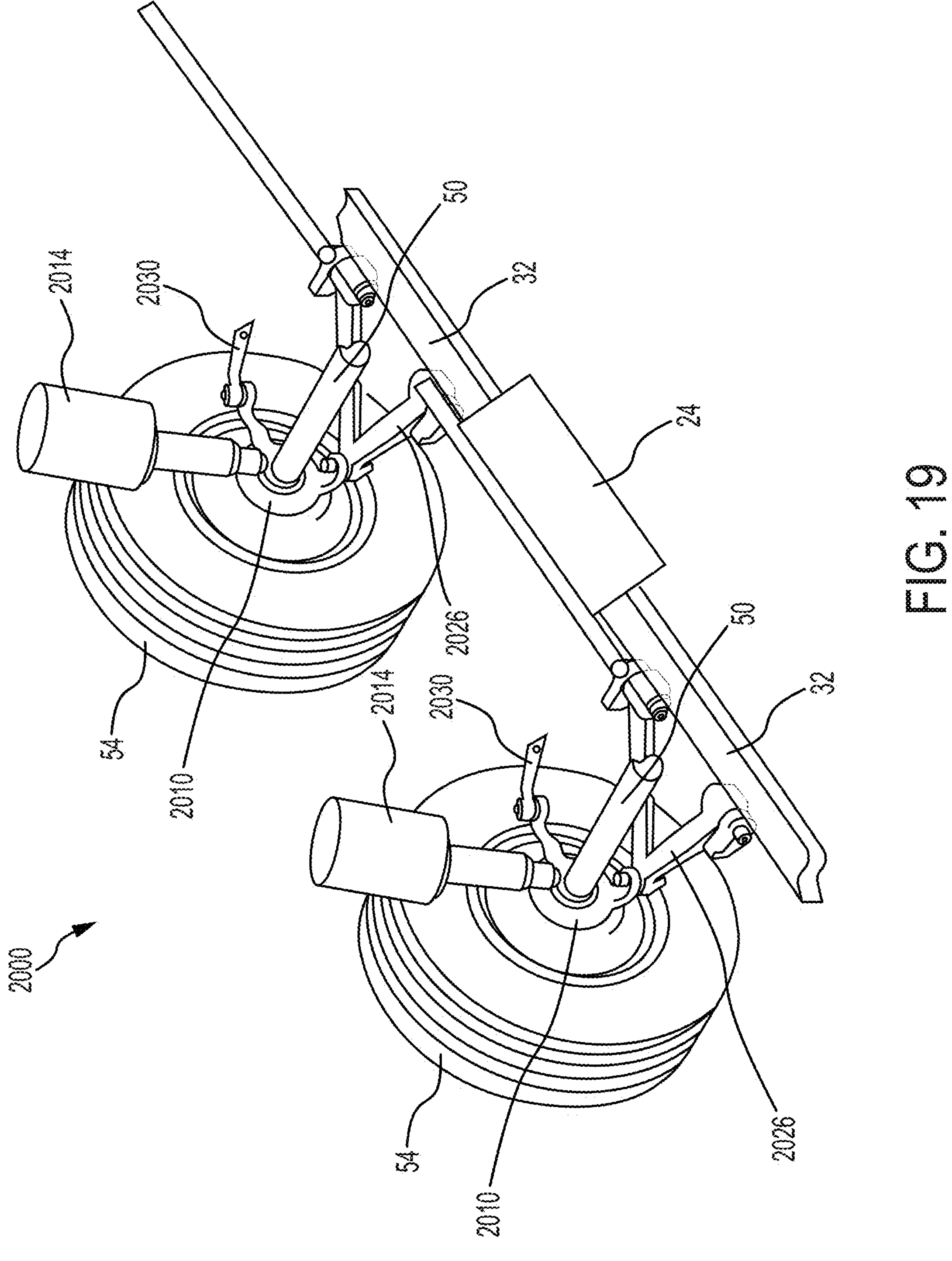
FIG. 19 is a perspective view of a suspension system of the vehicle of FIGS. 1-8, according to an exemplary embodiment.

As shown in FIGS. 9-10, the strut-damper 2014 extends in a substantially vertical direction (e.g., perpendicular to a road or surface on which the wheel and tire assembly 54 rest) and/or is substantially perpendicular to a frame portion (e.g., the front rail portion 32, etc.). In this regard, several strut-dampers 2014 may be positioned (e.g. adjacent to one another, etc.) so as to allow a plurality of strut-dampers 2014, axle assemblies, and/or wheel and tire assemblies to be positioned adjacent to one another, for example as shown in FIGS. 18-19. In other embodiments, the strut-damper 2014 extends in a substantially longitudinal direction and/or is substantially parallel to a frame portion (e.g., the front rail portion 32, etc.), for example as shown in FIG. 18. In this regard, several strut-dampers 2014 may be positioned with a first strut-damper 2014 extending in a forward direction and a second strut-damper 2014 extending in a rearward direction, so as to allow a plurality of strut-dampers 2014, axle assemblies, and/or wheel and tire assemblies to be positioned adjacent to one another. In yet other embodiments, the strut-damper 2014 extends in another direction (e.g., angled relative to a frame portion, etc.), so as to allow a plurality of strut-dampers 2014, axle assembles, and/or wheel and tire assemblies to be positioned adjacent to one another.

As shown in FIG. 9, the knuckle 2010 is also coupled to the drop link 2018. The drop link 2018 may be coupled to the knuckle 2010 at a first end, and the torsion bar 2022 at a second end. The drop link 2018 may be coupled to the knuckle 2010 and/or the torsion bar 2022 via any suitable coupling mechanism (e.g., mounted using ball joints, eyelets, etc., pinned, welded, fastened, etc.). In an exemplary embodiment, the drop link 2018 is coupled to a top portion of the knuckle 2010. In other embodiments, the drop link 2018 is coupled to another portion of the knuckle 2010 (e.g., a forward-middle portion, a rearward-middle portion, a lower portion, etc.). In an exemplary embodiment, the drop link 2018 is configured to position the torsion bar 2022 below other components of the vehicle 10 (e.g., the front section 22, the middle section 24, the rear section 26, battery housings, axles, motors, etc.).

As shown in FIG. 9, the torsion bar 2022 is an elongated structural member (e.g., a beam, bar, tube, etc.), and is configured to support a portion of a load of the vehicle 10 (e.g., weight, unsprung mass, sprung mass, etc.) and/or absorb shocks, impulses, or sudden forces that are transmitted to the vehicle 10 through the tractive elements (e.g., the wheel and tire assembly 54, etc.). For example, the torsion bar 2022 may be configured to supplement the chassis 20 or the frame (e.g., rail portion 30, rail portion 32, rail portion 34, rail portion 36, etc.) to support a portion of a mass or load of the vehicle 10. In some embodiments, the vehicle 10 includes a battery (e.g., batteries 60, energy storage device, etc.) that is supported by and/or coupled to the chassis 20, and the torsion bar 2022 is configured to support a portion of a mass of the battery. The torsion bar 2022 may be of any suitable thickness and have any suitable diameter throughout the length of the torsion bar 2022, and may be made of any suitable material (e.g., steel, etc.). In an exemplary embodiment, the torsion bar 2022 extends in a longitudinal direction that is substantially parallel to a frame portion (e.g., the front rail portion 32, etc.), and is coupled (e.g., fixed, welded, fastened, etc.) to the drop link 2018 at a first end and components of the chassis 20 at a second end (e.g., the frame portions of the front section 22, the middle section 24, and/or the rear section 26, etc.). In some embodiments, the torsion bar 2022 is coaxial with a pivot point of the lower control arm 2026. In other embodiments, the torsion bar 2022 extends in a lateral direction that is substantially perpendicular to a frame portion (e.g., the front rail portion 32, etc.), and is coupled to the drop link 2018 at a first end and components of the chassis 20 at a second end. In yet other embodiments, the torsion bar 2022 extends in another suitable direction (e.g., angled, etc.), and is coupled to the drop link 2018 at a first end and components of the chassis 20 at a second end.

As shown in FIGS. 9-10, the knuckle 2010 is also coupled to the lower control arm 2026 and the steering link 2030. In an exemplary embodiment, the lower control arm 2026 is coupled (e.g., fixed, welded, fastened, etc., via a ball joint, bolts, bushings, etc.) to the knuckle 2010 at a first end and a frame portion at a second end (e.g., the front rail portion 32, etc.), and is configured to stabilize the vehicle 10 (e.g., allow the chassis 20 and the tractive elements to move in unison, etc.). In an exemplary embodiment, the lower control arm 2026 is an A-bar control arm, and is formed of any suitable material (e.g., stamped steel, cast iron, cast aluminum, etc.). In some embodiments, the lower control arm 2026 is an H-bar control arm, and is configured to form a pivot axis for the knuckle 2010 and/or constrain the knuckle 2010 (the front axle 50, the tractive elements, etc.) to be steered in a forward direction, such that some components of the suspension system 2000 may be removed (e.g., the steering link 2030, etc.). In yet other embodiments, the lower control arm 2026 is an L-bar, a wishbone, or any other suitable configuration of a control arm. As shown in FIGS. 9-10, in an exemplary embodiment the steering link 2030 is coupled (e.g., fixed, welded, fastened, etc., via a ball joint, bolts, bushings, etc.) to the knuckle 2010 at a first end, and a steering gearbox at a second end. In an exemplary embodiment, the steering link 2030 includes a plurality of rods that are coupled together (e.g., via ball joints, tie rod end, etc.), which are configured to transfer the motion of a steering assembly output (e.g., steering wheel, rod, etc.) to the tractive elements. The steering link 2030 may be an Ackermann steering link, a bell-crank steering link, a rack-and-pinion steering link, a short rack-and-pinion steering link, and/or any other suitable steering link.

According to the exemplary embodiment shown in FIG. 10, the suspension system 2000 does not include the drop link 2018. As shown in FIG. 10, the torsion bar 2022 extends in a longitudinal direction that is substantially parallel to a frame portion (e.g., the front rail portion 32, etc.), and is coupled to the lower control arm 2026 at a first end and components of the chassis 20 at a second end (e.g., the frame portions of the front section 22, the middle section 24, and/or the rear section 26, etc.). According to an exemplary embodiment, the torsion bar 2022 is coaxial with a pivot point of the lower control arm 2026. In other embodiments, the torsion bar 2022 extends in a lateral direction that is substantially perpendicular to a frame portion (e.g., the front rail portion 32, etc.), and is coupled to the lower control arm 2026 at a first end and components of the chassis 20 at a second end. In yet other embodiments, the torsion bar 2022 extends in another suitable direction (e.g., angled, etc.), and is coupled to the lower control arm 2026 at a first end and components of the chassis 20 at a second end.

As discussed briefly above, according to an exemplary embodiment the suspension system 2000 is configured to increase the lateral space between laterally opposing front, rear, and/or middle suspension systems 2000. For example, the vehicle 10 may include two laterally opposed suspension systems 2000 at the front section 22 (e.g., a first suspension system at the front rail portion 30, and a laterally opposed second suspension system at the front rail portion 32). According to an exemplary embodiment, the strut-dampers 2014 include shock absorbing components (e.g., a strut housing, a dampening unit, a piston, a piston rod, hydraulic fluid, etc.) without a spring (e.g., a coil spring, etc.). As discussed above, the strut-dampers 2014 may extend in a substantially vertical direction and/or are substantially perpendicular to a frame portion (e.g., the first suspension system is substantially perpendicular to the front rail portion 30, and the second suspension system is substantially perpendicular to the front rail portion 32). In other embodiments, the strut-dampers 2014 extend in a substantially longitudinal direction and/or are substantially parallel to the frame (e.g., the first suspension system is substantially parallel to the front rail portion 30, and the second suspension system is substantially parallel to the front rail portion 32). In this regard, the strut-dampers 2014 may be configured to reduce the overall size of the suspension systems 2000 (e.g., no spring, reduce the diameter of a top portion of the strut-damper 2014, provide a narrower profile compared to traditional suspension systems, etc.), and the position and/or orientation of the suspension systems 2000 (e.g., the strut-dampers 2014, etc.) may increase the lateral space between the laterally opposed suspension systems 2000. The increased lateral space between the laterally opposed suspension systems 2000 may provide additional space between components of the chassis 20 of the vehicle (e.g., the front rail portion 30 and the front rail portion 32 of the front section 22, the middle section 24, the rail portions 34-36 of the rear section 26, etc.), which may be void and/or filled with other vehicle components (e.g., batteries, hydraulics, auxiliary electrical components, motors, axles, gears, etc.).

Also as discussed briefly above, according to an exemplary embodiment the suspension system 2000 is configured to allow a plurality of strut-dampers 2014, tractive elements, and/or axle assemblies to be positioned adjacent to one another. For example, the vehicle 10 may include two adjacent suspension systems 2000 at the front section 22, the middle section 24, and/or the rear section 26 (e.g., the rear section 26 includes two rear axle assemblies, a first suspension system 2000 at the rear rail portion 34 and an adjacent second suspension system 2000 at the rear rail portion 34). According to an exemplary embodiment, the strut-dampers 2014 include shock absorbing components (e.g., a strut housing, a dampening unit, a piston, a piston rod, hydraulic fluid, etc.) without a spring (e.g., a coil spring, etc.). As discussed above, the strut-dampers 2014 may extend in a substantially vertical direction and/or are substantially perpendicular to a frame portion (e.g., the rear rail portion 34). In other embodiments, the strut-dampers 2014 extend in a substantially longitudinal direction and/or are substantially parallel to the frame (e.g., the first strut-damper 2014 extends longitudinally in a forward direction, and the second strut-damper 2014 extends longitudinally in a rearward direction). In this regard, the strut-dampers 2014 may be configured to reduce the overall size of the suspension systems 2000 (e.g., no spring, reduce the diameter of the strut-damper 2014, provide a narrower profile, etc.), and/or the position and/or orientation of the suspension systems 2000 (e.g., the strut-dampers 2014, etc.) may permit two suspension systems 2000 to be used in tandem. As such, the size, position, and/or orientation of the suspension systems 2000 (e.g., the strut-dampers 2014, etc.) may allow a plurality of strut-dampers 2014, tractive elements, and/or axle assemblies to be positioned adjacent to one another.

Figure 11:
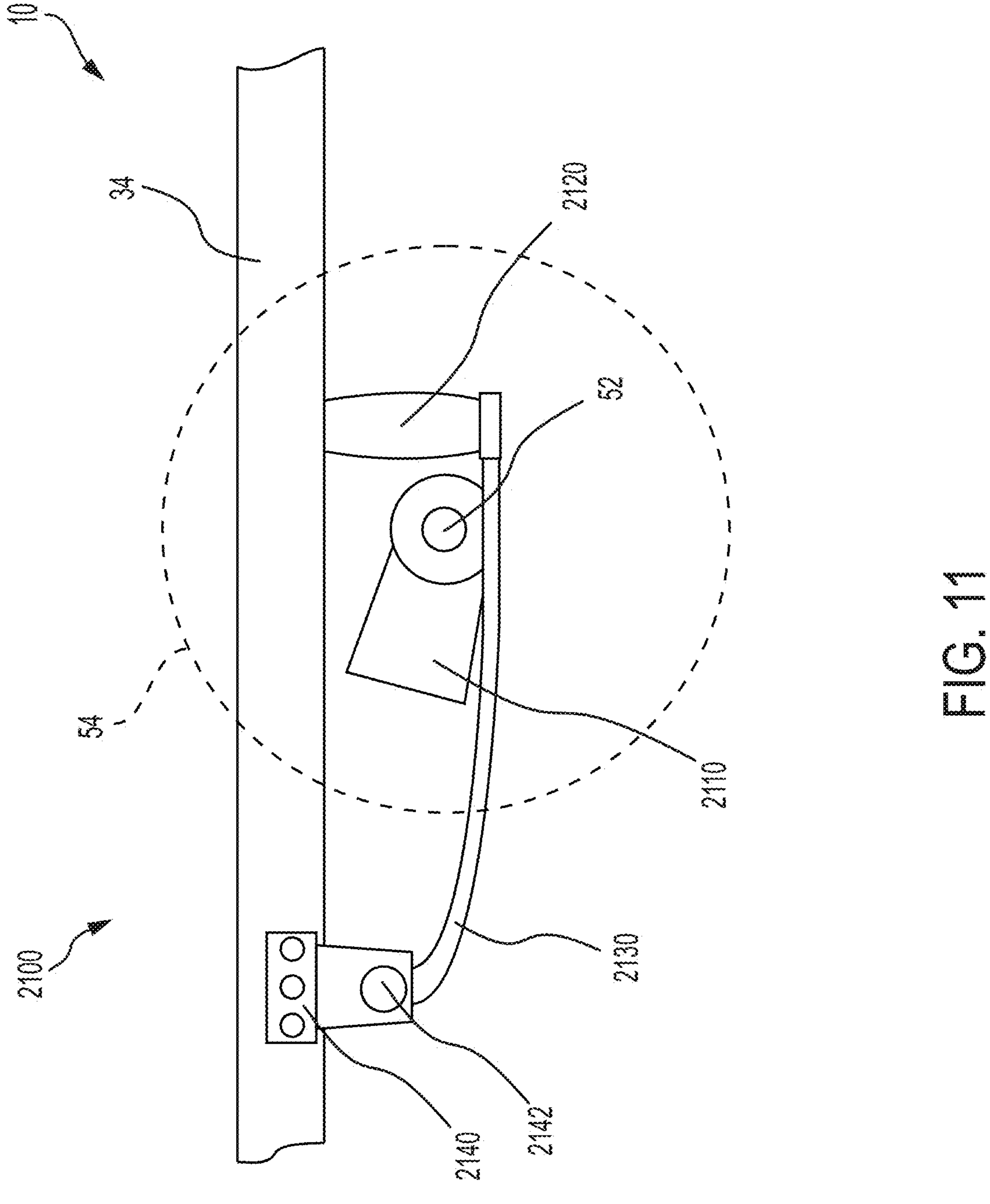
FIG. 11 is a left side view of a suspension system of the vehicle of FIGS. 1-8 configured as a motor suspension system, according to an exemplary embodiment.

According to the exemplary embodiment shown in FIG. 11, a suspension system, shown as suspension system 2100, is configured to couple a motor to components of the vehicle 10 of FIGS. 1-8. In an exemplary embodiment, the suspension system 2100 couples a motor to the front section 22 (e.g., the front rail portion 30 and/or the front rail portion 32), the rear section 26 (e.g., the rear rail portion 34 and/or the rear rail portion 36), the middle section 24, and/or another component of the vehicle 10. In some embodiments, the suspension system 2100 is also configured to couple a motor to an axle of the vehicle 10 (e.g., a solid axle, the front axle 50, the rear axles 52, independent axles, swing axles, etc.), such that the suspension system 2100 supports an axle-mounted motor assembly. In some embodiments, each axle of the vehicle 10 (e.g., the front axle 50, the rear axles 52, solid axles, independent axles, swing axles, etc.) includes one or more suspension systems 2100. In yet other embodiments, each axle of the vehicle 10 (e.g., the front axle 50, the rear axle 52, a swing axle, etc.) are independent axles, and each independent axle includes a suspension system 2100. According to an exemplary embodiment, the suspension system 2100 is configured as a trailing-arm suspension system (e.g., where the motor is positioned behind a pivot axis of the suspension system 2100). In other embodiments, the suspension system 2100 is configured as a leading-arm suspension system (e.g., where the motor is positioned in front of a pivot axis of the suspension system 2100). In yet other embodiments, the suspension system 2100 is configured as another suitable suspension system (semi-trailing arm, multi-link, leaf spring, swinging arm, etc.).

As shown in FIG. 11, the suspension system 2100 includes an actuator, shown as motor 2110, and a shock absorber and/or damper, shown as spring 2120. Further, the suspension system 2100 may also include a linkage, shown as support link 2130, and a fastener, shown as bracket 2140. In some embodiments, the suspension system 2100 includes additional, fewer, and/or different working components. According to an exemplary embodiment, the suspension system 2100 is a rear suspension system (e.g., at the rear axle 52 of the rear section 26 of the vehicle 10). In some embodiments, the suspension system 2100 is a front suspension system (e.g., at the front axle 50 of the front section 22 of the vehicle 10). In other embodiments, the suspension system 2100 is another suitable suspension system (e.g., at the middle section 24 of the vehicle 10, at another component of the vehicle 10, etc.). In yet other embodiments, the vehicle 10 includes a plurality of suspension systems 2100, which are front suspension systems, rear suspension systems, and/or another suitable suspension systems (e.g., at the front axle 50, the rear axle 52, an independent axle, a swing axle, etc. of the vehicle 10).

As shown in FIG. 11, the motor 2110 is coupled to an axle assembly and supported by components of the suspension system 2100. The motor 2110 may be coupled (e.g., fixed, mounted, etc.) to an axle assembly (e.g., shown as the rear axle 52, a solid axle, the front axle 50, an independent axle, a swing axle, etc.), and may be configured to independently drive (e.g., power, control, propel, etc.) the tractive elements (e.g., the wheel and tire assemblies 54) of the vehicle 10. In an exemplary embodiment, the motor 2110 is an electric motor. In some embodiments, the motor 2110 (and the rear axle 52, etc.) is/are an e-axle. In other embodiments, the motor 2110 is any other suitable motor configured to drive the tractive elements (e.g., a DC motor, a permanent magnet brushless DC motor, an induction motor, a permanent magnetic synchronous motor, a switched reluctance motor, etc.). As shown in FIG. 11, in an exemplary embodiment the motor 2110 is coupled to the rear axle 52 at a forward position relative to the rear axle 52. In this regard, the motor 2110 may be positioned forward relative to the rear axle, more toward a pivot point compared to traditional axle-mounted motor suspension systems, so as to reduce the motor's rotational inertia about (e.g., moment at) the pivot point, as discussed below.

As shown in FIG. 11, the spring 2120 is coupled to components of the chassis and a linkage. The spring 2120 may be coupled (e.g., fixed, mounted, etc.) to a frame portion at a first end (e.g., the rear rail portion 34 of the rear section 26, etc.) and the support link 2130 at a second end. In this regard, the spring 2120 may extend between components of the vehicle 10 (e.g., the rear rail portion 34, etc.) and components of the suspension system 2100 (e.g., the support link 2130, etc.), in order to support the motor 2110, the support link 2130, the rear axle 52, etc. In an exemplary embodiment, the spring 2120 is a gas spring damper, and is configured to absorb shocks, impulses, and/or forces that are transmitted and/or produced by components of the vehicle 10. In some embodiments, the spring 2120 is a compression spring. In yet other embodiments, the spring 2120 is any other suitable spring configured to support components of the suspension system 2100 and/or absorb shocks, impulses, and/or forces of the vehicle 10 (e.g., a helical spring, a coil spring, a rubber spring, a leaf spring, etc.). As shown in FIG. 11, in an exemplary embodiment, the spring 2120 is positioned at a rearward position relative to the rear axle 52 and/or the motor 2110. In this regard, the spring 2120 may be positioned rearward relative to the rear axle 52 and/or the motor 2110, so as to support the motor 2110, the support link 2130, the rear axle 52, etc. as components of the vehicle 10 (e.g., the motor 2110, etc.) generate rotational inertia about (e.g., moment at) a pivot point, as discussed below.

As shown in FIG. 11, the support link 2130 is coupled to a shock absorber and/or damper and a fastener, and is configured to support a motor and/or axle assembly. The support link 2130 may be coupled (e.g., fixed, mounted, etc.) to the spring 2120 at a first end and the bracket 2140 at a second end, and may be configured to support the motor 2110 (and/or the rear axle 52, etc.) at a middle portion. In this regard, the support link 2130 may be configured to connect components of the suspension system 2100 (e.g., the spring 2120, etc.) to components of the chassis (e.g., the rear rail portion 34 via the bracket 2140, etc.), and connect and/or support the motor 2110 and/or the rear axle 52. In an exemplary embodiment, the support link 2130 is a trailing-arm formed of any suitable material (e.g., stamped steel, cast iron, cast aluminum, etc.), and is configured to absorb shocks, impulses, and/or forces that are transmitted and/or produced by components of the vehicle 10. In some embodiments, the support link 2130 is configured to support the motor 2110 (and/or the rear axle 52, etc.) at another portion of the support link 2130 (e.g., a rearward portion, a forward portion, etc.).

As shown in FIG. 11, the bracket 2140 is coupled to components of the chassis and a linkage. The bracket 2140 may be coupled (e.g., fixed, mounted, welded, etc.) to the rear rail portion 34 and the support link 2130. In this regard, the bracket 2140 may be configured to connect components of the suspension system 2100 (e.g., the support link 2130, etc.) to components of the chassis (e.g., the rear rail portion 34, etc.). According to an exemplary embodiment, the connection between the bracket 2140 and the support link 2130 forms a pivot point (e.g., shown as pivot point 2142) for the suspension system 2100. According to an exemplary embodiment, the pivot point 2142 is a lateral axis of rotation that components of the suspension system 2100 (e.g., the motor 2110, the rear axle 52, the spring 2120, etc.) rotate about as components of the vehicle 10 generate forces (e.g., components experience lateral displacement, the motor drives the tractive elements, unsprung mass, sprung mass, etc.), as discussed below.

As discussed briefly above, according to an exemplary embodiment the suspension system 2100 is configured to reduce the effective rotational inertia about (e.g., moment at, etc.) a pivot point compared to traditional suspension systems. In an exemplary embodiment, the motor 2110 is positioned forward relative to the rear axle 52 toward the pivot point 2142, and the spring 2120 is positioned rearward relative to the rear axle 52 and/or the motor 2110. When the vehicle 10 encounters uneven terrain (e.g., bumps, holes, etc.) and/or components of the suspension system 2100 are vertically displaced, components of the suspension system 2100 (e.g., the motor 2110, the rear axle 52, the spring 2120, etc.) create an effective rotational inertia about (e.g., a moment at) the pivot point 2142. Positioning and/or orienting the motor 2110 (e.g., center of gravity, etc.), the spring 2120, etc. more toward the pivot point 2142 may reduce the effective rotational inertia about (e.g., moment at) the pivot point 2142 (e.g., by reducing the distance between a mass and the lateral axis of rotation). In some embodiments, when the motor 2110 drives (e.g., powers, controls, propels, etc.) the tractive elements (e.g., the wheel and tire assemblies 54), the motor generates a rotational inertia about a lateral axis (e.g., the rear axle 52, etc.) and/or an effective rotational inertia about (e.g., moment at) the pivot point 2142. As discussed above, positioning and/or orienting the motor 2110 (e.g., center of gravity, etc.), the spring 2120, etc. more toward the pivot point 2142 may reduce the effective rotational inertia about (e.g., moment at) the pivot point 2142 (e.g., by reducing the distance between a mass and/or rotational force and the lateral axis of rotation). In this regard, the positioning and/or orientation of the motor 2110 may reduce the effective suspension inertia, which may increase suspension performance and/or reduce stress (e.g., force, load, wear and tear, etc.) on the motor 2110, the rear axle 52, and/or other components of the suspension system 2100 (e.g., the spring 2120, support link 2130, etc.). This reduced stress may also allow for different components of a suspension system of the vehicle 10 (e.g., lighter weight, more cost efficient, increased durability, etc.).

According to the exemplary embodiments shown in FIGS. 12-17, a suspension system, shown as suspension system 2200, is configured to couple the tractive elements (e.g., wheel and tire assemblies 54) to the chassis 20 of the vehicle 10 of FIGS. 1-8. In an exemplary embodiment, the suspension system 2200 is configured to couple a plurality of tractive elements (e.g., wheel and tire assemblies 54) to the front section 22 (e.g., the front rail portion 30 and/or the front rail portion 32), the rear section 26 (e.g., the rear rail portion 34 and/or the rear rail portion 36), the middle section 24, and/or another component of the vehicle 10. In one embodiment, the suspension system 2200 is configured as an independent auxiliary axle (e.g., where the tractive elements are positioned on an axle and configured to move independent of one another). In another embodiment, the suspension system 2200 is configured as a trailing-arm suspension system (e.g., where the tractive elements are positioned behind pivot axes of the suspension system 2200). In other embodiments, the suspension system 2200 is configured as a leading-arm suspension system (e.g., where the tractive elements are positioned in front of pivot axes of the suspension system 2200). In yet other embodiments, the suspension system 2200 is a another suitable suspension system, or combination thereof (e.g., an independent trailing-arm suspension system, an independent swing axle suspension system, a leading-arm suspension system, etc.). In some embodiments, the suspension system 2200 is also configured to be combined with other suspension elements (e.g., a sway bar, a torsion bar, strut-damper, etc.).

As shown in FIGS. 12-17, the suspension system 2200 includes a suspension assembly, shown as suspension assembly 2210. As will be discussed in greater detail below, the suspension assembly 2210 may include components that replace traditional components (e.g., air springs, air bags, etc.), reduce overall size, power demand, energy losses during use, etc. compared to traditional suspension assemblies. For example, the suspension assembly 2210 may be configured to reduce the overall size of the suspension assembly 2210 (e.g., replaces air springs, air bags, etc.) at a longitudinal portion of the chassis compared to traditional suspension assemblies, so as to provide additional lateral space between components of the chassis. Similarly, the suspension assembly 2210 may be configured selectively deploy an axle and/or tractive elements in a way (e.g., in a direction substantially parallel to a frame portion of the chassis, etc.) that provides additional space between components of the chassis compared to traditional suspension assemblies. In addition, the suspension assembly 2210 may be configured to include components (e.g., a driver, a receiver, a motor, etc.) that provide for increased control and/or precision in deploying an axle and tractive elements, and/or reduce the power demand and/or energy loss during deployment, compared to traditional suspension assemblies.

In an exemplary embodiment, the suspension assembly 2210 is coupled to a frame portion, shown as front rail portion 30, and an axle, shown as axle 2212. The frame portion may be any suitable frame portion of the vehicle 10 (e.g., frame portions 30-36, middle section 24, etc.), and may include a rim, ledge, and/or ridge, shown as frame rim 2214, that extends laterally in a substantially perpendicular direction from the front rail portion 30. The axle 2212 may be an axle of any suitable shape (e.g., L-shape, solid beam, solid bar, hallow beam or tube, leaf, etc.) and/or material (e.g., stamped steel, cast iron, cast aluminum, etc.), and may include a flange, shown as axle flange 2216, that extends laterally in a substantially perpendicular direction from a top portion of the axle 2212. According to an exemplary embodiment, the suspension assembly 2210 is coupled to the frame rim 2214 and/or the axle flange 2216. The frame rim 2214 and axle flange 2216 may also couple (e.g., engage, contact, separated by, etc.) a bearing, shown as bearing 2218, which may be configured to reduce the frictional forces between the frame rim 2214 and the axle flange 2216, and/or ease movement (e.g., rotational movement, etc.) relative to one another. In this regard, the bearing 2218 may be configured to reduce the frictional forces and/or ease the movement as the position and/or orientation of the axle 2212 (e.g., the axle flange 2216) and the tractive elements are modified relative to the chassis (e.g., the front rail portion 30, the frame rim 2214), as discussed below.

In an exemplary embodiment, the suspension assembly 2210 is positioned longitudinally on the chassis (e.g., along the front rail portion 30, etc.). The suspension assembly 2210 may be configured to modify the position and/or the orientation of the axle 2212 and the tractive elements relative to the chassis (e.g., the front rail portion 30). For example, the suspension assembly 2210 may be configured to selectively deploy the axle 2212 and the tractive elements to support the weight of the vehicle 10 (e.g., vertically displace the axle 2212 down and/or up, maintain the axle 2212 at a specific position/orientation, maintain the tractive elements at a specific height, etc. to selectively engage/disengage the tractive elements with a surface, etc.). In addition, the suspension assembly 2210 may also be configured to suspend the axle 2212 and the tractive elements to provide additional suspension to the vehicle 10 (e.g., vertically suspend and/or position the axle 2212 and tractive elements to absorb shocks, impulses, or sudden forces transmitted to the vehicle 10, etc.). In this regard, the positioning, orientation, and/or configuration of the suspension assembly 2210 (and the axle 2212, the tractive elements, etc.) may increase the lateral space between laterally opposed suspension systems 2200, while also providing deployable and/or suspendable axles that may be used to support the vehicle 10 and/or provide additional suspension to the vehicle 10, as discussed below.

Figure 12:
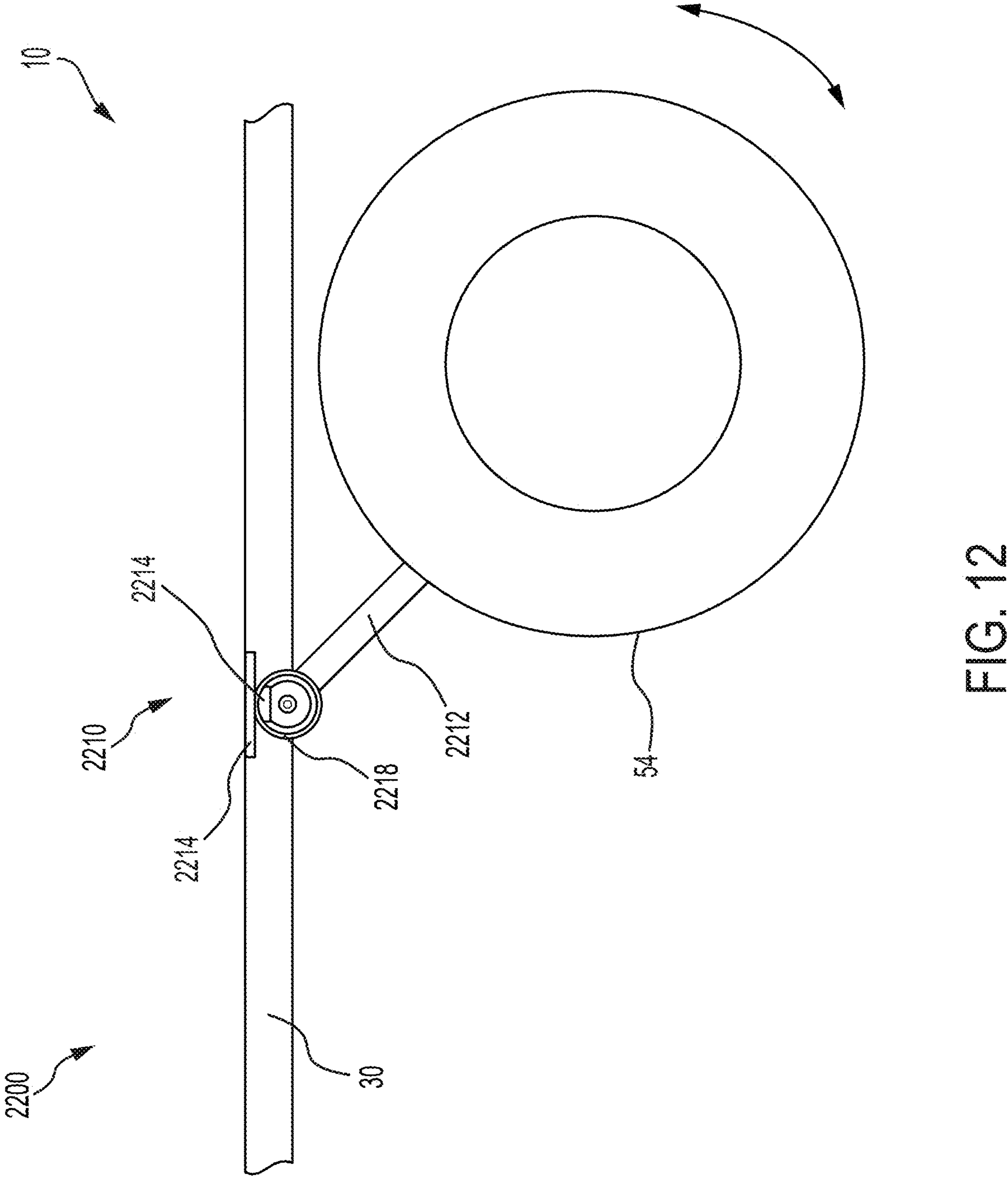
FIG. 12 is a left side view of a suspension system of the vehicle of FIGS. 1-8 configured as an axle suspension system, according to an exemplary embodiment.
Figure 13:
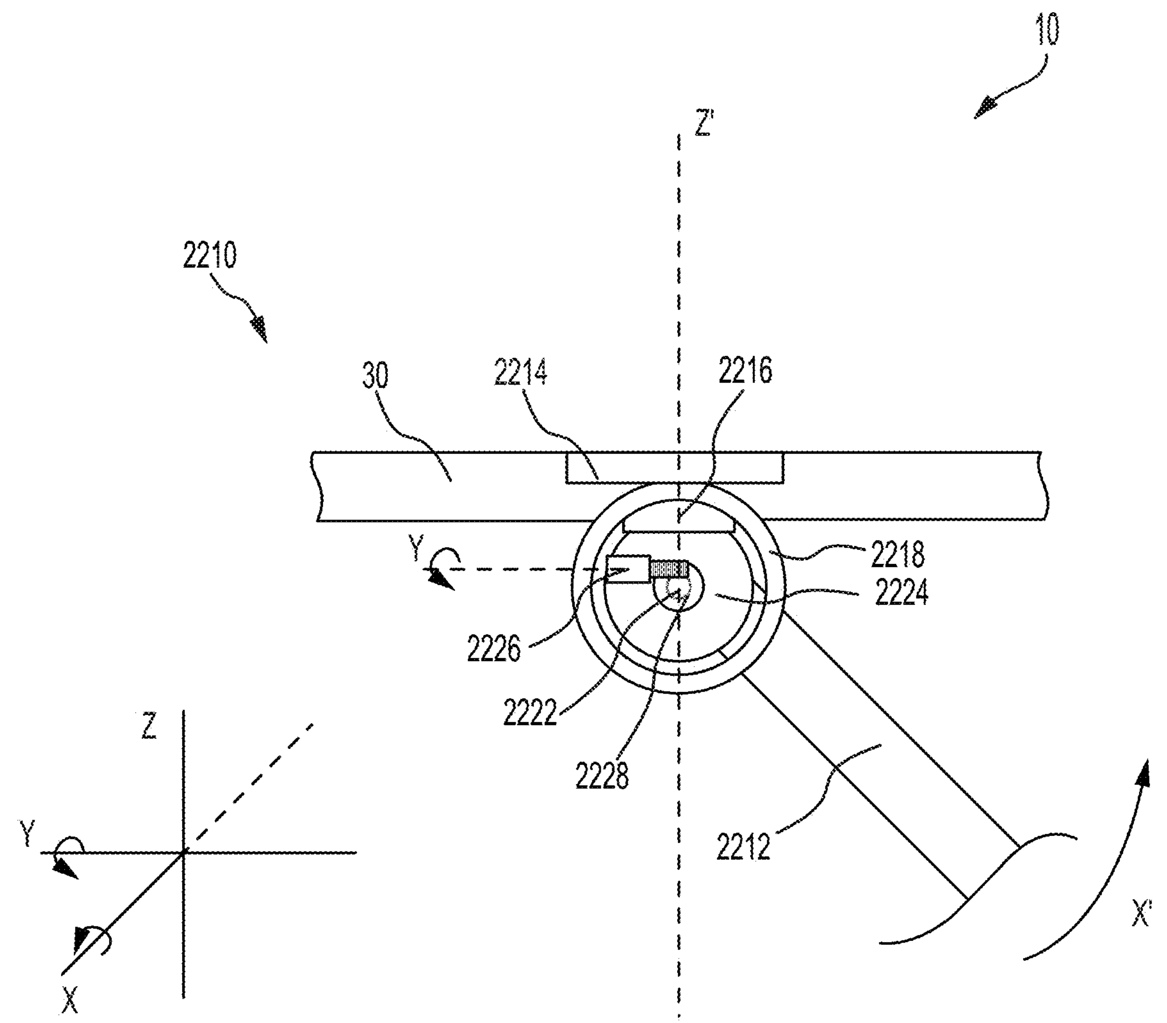
FIG. 13 is a left side view of a suspension assembly of the vehicle of FIGS. 1-8 configured as an axle suspension system, according to another exemplary embodiment.

According to the exemplary embodiment shown in FIG. 13, a cross-sectional side view of the suspension assembly 2210 of the vehicle 10 of FIGS. 1-8 and/or the suspension system 2200 of FIG. 12 is shown. According to an exemplary embodiment, the suspension assembly 2210 includes a connector, shown as sector shaft 2222, and a deployment element, shown as elastomer torsion spring 2224. Further, the suspension assembly 2210 may also include a driver, shown as worm shaft 2226. In some embodiments, the suspension assembly 2210 includes additional, fewer, and/or different working components. In an exemplary embodiment, components of the suspension assembly 2210 are configured to rotate to selectively modify the position and/or orientation of an axle and tractive elements relative to the chassis, as discussed below.

As shown in FIG. 13, the sector shaft 2222 is coupled to the elastomer torsion spring 2224. According to an exemplary embodiment, the elastomer torsion spring 2224 is formed of any suitable elastomeric material (e.g., polyisoprene, butyl rubber, EPDM, etc.) and is coupled (e.g., fixed, mounted, molded, etc.) to an exterior portion of the sector shaft 2222 using any suitable manufacturing technique (e.g., adhesive bonding, water bonding, transfer molding, etc.). In an exemplary embodiment, the elastomer torsion spring 2224 is coupled around a circumference of the sector shaft 2222. In some embodiments, the elastomer torsion spring 2224 is coupled around a portion (e.g., one-half, one-quarter, one-eighth, etc.) of a circumference of the sector shaft 2222. In yet other embodiments, the elastomer torsion spring 2224 is coupled along a length and/or around a (portion of a) circumference of the sector shaft 2222. Also according to an exemplary embodiment, the sector shaft 2222 and the elastomer torsion spring 2224 are coaxial. In some embodiments, the sector shaft 2222 and the elastomer torsion spring 2224 are coaxial with an axis of rotation of the suspension assembly 2210 (e.g., a substantially lateral axis, a substantially longitudinal axis, another axis, etc.). In yet other embodiments, the sector shaft 2222 and the elastomer torsion spring 2224 are not coaxial. Although a single elastomer torsion spring 2224 is shown in FIG. 13, it should be understood that the suspension assembly 2210 may include any number of elastomer torsion springs 2224 of any suitable shape, size, and/or configuration.

As shown in FIG. 13, the elastomer torsion spring 2224 is also coupled to the axle 2212. According to an exemplary embodiment, the elastomer torsion spring 2224 couples (e.g., engages, is mounted, is fixed, etc.) to the axle flange 2216. In some embodiments, the elastomer torsion spring 2224 is constantly coupled to the axle flange 2216. In other embodiments, the elastomer torsion spring 2224 couples to the axle flange 2216 for a predetermined period of time (e.g., during deployment, during suspension, for thirty minutes, one hour, one day, etc.). In an exemplary embodiment, the elastomer torsion spring 2224 is configured to rotate about an axis (e.g., a substantially lateral axis, a substantially longitudinal axis, another axis, etc.), and engage the axle flange 2216. As will be discussed in greater detail below, when the elastomer torsion spring 2224 rotates and/or engages the axle flange 2216, the axle flange 2216 may be configured to rotate about an axis to modify the position and/or orientation of the axle 2212 relative to the chassis.

As shown in FIG. 13, the sector shaft 2222 also includes a receiver, shown as worm wheel 2228, which is configured to engage components of the suspension assembly 2210 (e.g., the worm shaft 2226) and rotate about an axis (e.g., a substantially lateral axis, a substantially longitudinal axis, another axis, etc.). According to an exemplary embodiment, the worm wheel 2228 is of any suitable diameter (e.g., 5, 10, 15, 25, 50, 100, etc. inches), includes any suitable number of gear teeth (e.g., 50, 100, 250, 500, 1,000, 1,500, etc.), and is coupled (e.g., mounted, fixed, welded, molded, etc.) to a lateral end (e.g., face, etc.) of the sector shaft 2222. In an exemplary embodiment, the worm wheel 2228 includes a large number of gear teeth, thereby providing a high gear reduction ratio (e.g., 100:1, 250:1, 500:1, etc.), for example to increase the torque output, decrease the power output requirement, increase rotational precision and/or control, etc. In some embodiments, the worm wheel 2228 is coaxial with the sector shaft 2222, the elastomer torsion spring 2224, and/or other components of the suspension assembly 2210. However, in other embodiments the worm wheel 2228 is coupled to another portion of the sector shaft 2222 and/or is not coaxial with the sector shaft 2222, the elastomer torsion spring 2224, and/or other components of the suspension assembly 2210. In yet other embodiments, the worm wheel 2228 is not a worm wheel 2228; rather, is another suitable receiver, for example a planetary gear, a bevel gear, a miter gear, is part of a gear train, etc.

As shown in FIG. 13, the sector shaft 2222 (e.g., the worm wheel 2228) is coupled to the worm shaft 2226. According to an exemplary embodiment, spiral threads of the worm shaft 2226 are configured to couple (e.g., engage, mate, mesh, etc.) the gear teeth of the worm wheel 2228. Like the worm wheel 2228, the worm shaft 2226 may be of any suitable configuration (e.g., single thread, dual thread, self-locking, etc.) and may include any suitable number of spiral threads (e.g., 10, 25, 50, etc.). According to an exemplary embodiment, the worm shaft 2226 is also connected to a motor (e.g., DC motor, electric motor, etc.), which is configured to drive (e.g., rotate, etc.) the worm shaft 2226 about an axis (e.g., a substantially lateral axis, a substantially longitudinal axis, another axis, etc.). As shown in FIG. 13, in an exemplary embodiment the worm shaft 2226 is substantially perpendicular to the worm wheel 2228. In this regard, when the worm shaft 2226 engages the worm wheel 2228, the motor may rotate the worm shaft 2226 about a first axis (e.g., a longitudinal axis, axis Y, etc.), which may cause the worm wheel 2228 to rotate about a substantially perpendicular second axis (e.g., a lateral axis, axis X, etc.).

In some embodiments, the worm shaft 2226 is not a worm shaft; rather, is a worm gear configured to rotate the worm wheel 2228 (and/or the sector shaft 2222). In an exemplary embodiment, at least one of the worm wheel 2228 and the worm gear have a larger diameter and/or a larger number of gear teeth, thereby providing a high gear reduction ratio (e.g., 100:1, 250:1, 500:1, etc.). In yet other embodiments, the worm shaft 2226 is yet another suitable driver configured to rotate the worm wheel 2228 (and/or the sector shaft 2222), for example a bevel gear, a planetary gear, a hypoid gear, a rack, is part of a gear train, etc. In this regard, in some embodiments the worm shaft 2226 is substantially planar with the worm wheel 2228, and the worm shaft 2226 and worm wheel 2228 rotate about an axis in the same plane (e.g., a substantially longitudinal axis, a substantially lateral axis, another axis, etc.).

As discussed above, according to an exemplary embodiment the suspension assembly 2210 is configured to modify the position and/or orientation of the axle 2212 and tractive elements relative to the chassis (e.g., the front rail portion 30). For example, the spiral threads of the worm shaft 2226 may engage (e.g., mate, couple, mesh, etc.) the gear teeth of the worm wheel 2228 of the sector shaft 2222. A motor may drive the worm shaft 2226 to rotate the worm shaft 2226 about a first axis (e.g., a longitudinal axis, axis Y, etc.), causing the worm wheel 2228 to rotate about a second axis (e.g., a lateral axis, axis X, etc.). In some embodiments, the worm wheel 2228 and/or the worm shaft 2226 is configured to generate a high gear reduction ratio, for example to increase torque output, decrease the power required by the motor, increase gear rotation precision, increase control of components of the suspension assembly 2210, etc. In an exemplary embodiment, rotation of the worm wheel 2228 causes the sector shaft 2222 and the elastomer torsion spring 2224 to rotate about the second axis (e.g., the lateral axis, axis X, etc.). The elastomer torsion spring 2224 may engage the axle flange 2216, causing the axle flange 2216 to rotate about the second axis (e.g. the lateral axis, axis X, etc.). In an exemplary embodiment, the bearing 2218 reduces the frictional forces between the axle flange 2216 and the frame rim 2214, and/or eases the movement of the axle flange 2216 as the axle flange 2216 rotates. As the axle flange 2216 rotates about the second axis (e.g., the lateral axis, axis X, etc.), the axle 2212 and the tractive elements may also rotate about the second axis and move along and/or be positioned along path X' (e.g., vertically up, vertically down, maintained at a position, etc.). In this regard, the components of the suspension assembly 2210 may be configured to selectively modify and/or maintain the position and/or orientation (e.g., vertically reposition, maintain position, etc.) of the axle 2212 and tractive elements to support the vehicle 10 and/or provide additional suspension to the vehicle 10.

Figures 14, 15:
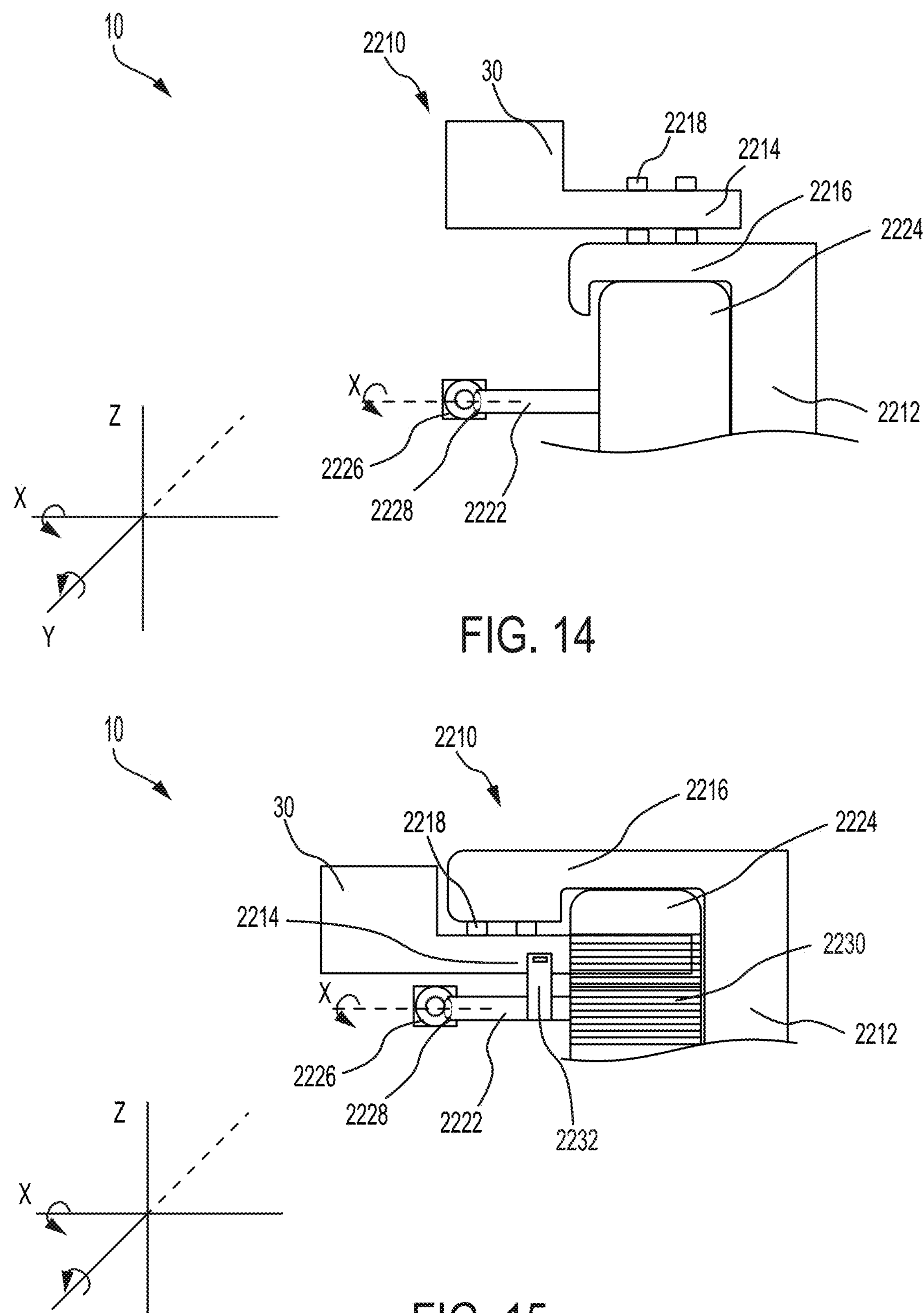
FIG. 14 is a front cross-sectional view of a suspension assembly of the vehicle of FIGS. 1-8 configured as an axle suspension assembly, according to an exemplary embodiment.
FIG. 15 is a front cross-sectional view of a suspension assembly of the vehicle of FIGS. 1-8 configured as an axle suspension assembly, according to another exemplary embodiment.

According to the exemplary embodiments shown in FIGS. 14-15, a cross-sectional front view of a top portion of a suspension assembly of the vehicle 10 of FIGS. 1-8, the suspension system 2200 of FIG. 12, and/or the suspension assembly 2210 of FIG. 13 is shown. FIG. 14 illustrates a cross-sectional front view of the suspension assembly 2210 of FIG. 13, cut along the Z' plane of FIG. 13 (e.g., the X-Z plane), according to one embodiment. FIG. 15 illustrates a cross-sectional front view of the suspension assembly 2210 of FIG. 13, cut along the Z' plane of FIG. 13 (e.g., the X-Z plane), according to another embodiment. As shown in FIGS. 14-15, and as discussed above, the suspension assembly 2210 includes the sector shaft 2222, the elastomer torsion spring 2224, and the worm shaft 2226. In some embodiments, the suspension assembly 2210 includes additional, fewer, and/or different working components, as discussed below.

As shown in FIGS. 14-15, the sector shaft 2222 is coupled to the elastomer torsion spring 2224. As discussed above, the elastomer torsion spring 2224 may be formed of any suitable elastomeric material, and may couple to an exterior portion (e.g., a circumference, a portion of a circumference, along a length, etc.) of the sector shaft 2222. In an exemplary embodiment, the elastomer torsion spring 2224 is coaxial with the sector shaft 2222 and/or the suspension assembly 2210; however, in other embodiments the sector shaft 2222 is not coaxial with the sector shaft 2222 and/or the suspension assembly 2210. According to the exemplary embodiment shown in FIG. 15, the elastomer torsion spring 2224 also includes an engagement surface, shown as splines 2230, which may include ridges, teeth, grooves, protrusions, etc. The splines 2230 may be configured to couple (e.g., engage, contact, mate, mesh, etc.) components of the suspension system 2200 (e.g., grooves at the frame rim 2214, grooves at the axle flange 2216, etc.) in order to maintain positional (e.g., rotational, angular, lateral, etc.) alignment between the elastomer torsion spring 2224 and other components of the suspension system 2200.

As shown in FIGS. 14-15, and as discussed above, the sector shaft 2222 also includes the worm wheel 2228, which is coupled to the worm shaft 2226. As discussed above, in an exemplary embodiment the worm wheel 2228 is coupled to a lateral end of the sector shaft 2222, is of any suitable size, and includes any suitable number of gear teeth. The worm shaft 2226 may also be of any suitable configuration and include any suitable number of spiral threads, and may be connected to a motor that is configured to drive (e.g., rotate) the worm shaft 2226 about an axis. In an exemplary embodiment, the worm shaft 2226 is substantially perpendicular to the worm wheel 2228. In this regard, when the worm shaft 2226 (e.g., the spiral threads, etc.) engages the worm wheel 2228 (e.g., the gear teeth), the motor may rotate the worm shaft 2226 about a first axis (e.g., a longitudinal axis, Y axis, etc.), which may cause the worm wheel 2228 to rotate about a substantially perpendicular second axis (e.g., a lateral axis, X axis, et.). In yet other embodiments, the worm shaft 2226 is not a worm shaft; rather, is another suitable gear configured to rotate the worm wheel 2228 (e.g., a worm, planetary, hypoid, rack, etc., part of a gear train, etc.), which may be substantially planar with the worm wheel 2228 and/or rotate about an axis in the same plane.

According to the exemplary embodiment shown in FIG. 15, the suspension assembly 2210 also includes a resistance element, shown as lock 2232, that is configured to selectively maintain (e.g., lock, unlock, etc.) the position and/or orientation of the sector shaft 2222, the elastomer torsion spring 2224, and/or the axle 2212. According to an exemplary embodiment, the lock 2232 is coupled to components of the chassis 20 (e.g., a frame portion, the frame rim 2214, etc.) and/or other components of the vehicle 10, and the sector shaft 2222. As the sector shaft 2222 rotates to a suitable position, and the axle 2212 and/or the tractive elements are selectively deployed, the lock 2232 may be configured to resist counter forces (e.g., from the axle 2212, the tractive elements, the vehicle 10, a surface, etc.) so as to maintain the position and/or orientation of the sector shaft 2222, the elastomer torsion spring 2224, and/or the axle 2212. In this regard, the lock 2232 may be configured to support (e.g., resist forces, lock, etc.) other components of the suspension assembly 2210 so as to maintain the position and/or orientation of the axle 2212 and/or the tractive elements.

As discussed above, according to an exemplary embodiment the suspension assembly 2210 of FIGS. 14-15 is configured to modify the position and/or orientation of the axle 2212 and the tractive elements relative to the chassis (e.g., the front rail portion 30). In an exemplary embodiment, the worm shaft 2226 engages the worm wheel 2228 of the sector shaft 2222. A motor may drive the worm shaft 2226 to rotate the worm shaft 2226 about a first axis (e.g., a longitudinal axis, axis Y, etc.), causing the worm wheel 2228 to rotate about a second axis (e.g., a lateral axis, axis X, etc.). The rotation of the worm wheel 2228 may cause the sector shaft 2222 and the elastomer torsion spring 2224 to rotate about the second axis (e.g., the lateral axis, axis X. etc.). In an exemplary embodiment, as the elastomer torsion spring 2224 rotates, the elastomer torsion spring 2224 engages the axle flange 2216 and/or a portion of the axle 2212, causing the axle flange 2216 and/or the axle 2212 to rotate about the second axis (e.g., the lateral axis, axis X, etc.). In some embodiments, as the elastomer torsion spring 2224 rotates, the splines 2230 engage grooves at the axle flange 2216 and/or grooves at the frame rim 2214. The engagement between the splines 2230 and the grooves may be configured to maintain suitable positional alignment between the elastomer torsion spring 2224 and the axle flange 2216 and/or the frame rim 2214. According to an exemplary embodiment, as the axle flange 2216 rotates, the bearing 2218 reduces the frictional forces and/or eases the movement between the axle flange 2216 and the frame rim 2214. Moreover, as the axle flange 2216 rotates about the second axis (e.g., the lateral axis, axis X, etc.), the axle 2212 and the tractive elements may also rotate about the second axis and move along and/or be positioned along a rotational path. In some embodiments, when the axle 2212 and the tractive elements are in a suitable position, the lock 2232 engages the sector shaft 2222 so as to maintain the position and/or orientation of the sector shaft 2222, the elastomer torsion spring 2224, and/or the axle 2212, thereby maintaining the position and/or orientation of the axle 2212 and the tractive elements. In this regard, the components of the suspension assembly 2210 may be configured to selectively modify and/or maintain the position and/or orientation of the axle 2212 and the tractive elements (relative to the chassis) to support the vehicle 10 and/or provide additional suspension to the vehicle 10.

Figure 16:
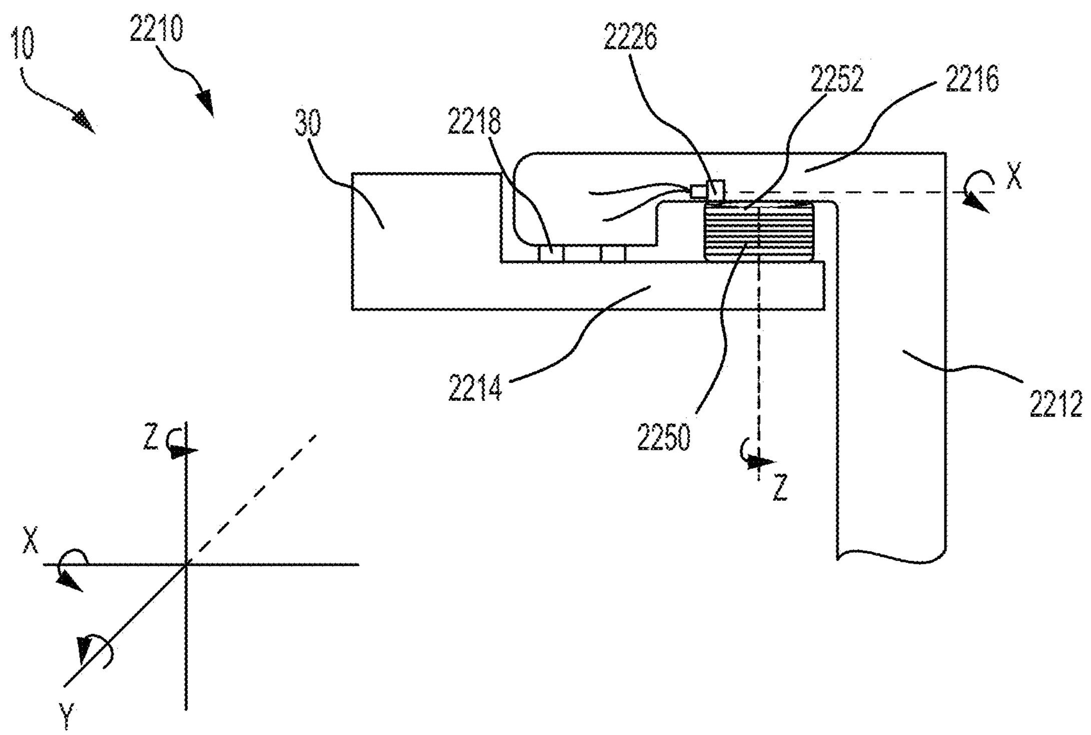
FIG. 16 is a front cross-sectional view of a suspension assembly of the vehicle of FIGS. 1-8 configured as an axle suspension assembly, according to another exemplary embodiment.

According to the exemplary embodiment shown in FIG. 16, a cross-sectional front view of a suspension assembly of the vehicle 10 of FIGS. 1-8, the suspension system 2200 of FIG. 12, and/or the suspension assembly 2210 of FIG. 13 is shown. FIG. 16 illustrates a cross-sectional front view of the suspension assembly 2210 of FIG. 13, cut along the Z' plane of FIG. 13 (e.g., the X-Z plane), according to another embodiment. According to an exemplary embodiment, the suspension assembly 2210 does not include the sector shaft 2222. Rather, the suspension assembly 2210 includes a deployment element, shown as spring 2250, and a driver, shown as worm shaft 2226. In some embodiments, the suspension assembly 2210 includes additional, fewer, and/or different working components. In an exemplary embodiment, components of the suspension assembly 2210 are configured to compress, extend, and/or be otherwise modified to selectively modify the position and/or orientation of an axle 2212 and tractive elements relative to the chassis, as discussed below.

As shown in FIG. 16, the spring 2250 is coupled to a frame portion and an axle. According to an exemplary embodiment, the spring 2250 is coupled to the frame rim 2214 of the front rail portion 30 at a first end, and the axle flange 2216 of the axle 2212 at a second end. In an exemplary embodiment, the spring 2250 is a coil spring that is configured to compress, extend, or otherwise be modified (e.g., in the direction of a substantially vertical axis, a substantially lateral axis, another axis, etc.). In other embodiments, the spring 2250 is another suitable spring (e.g., a compression spring, extension spring, torsion spring, conical spring, volute spring, disc spring, etc.). In an exemplary embodiment, a portion and/or all of the spring 2250 is positioned within the axle 2212 (e.g., the axle 2212, the axle flange 2216, etc.). In other embodiments, none of the spring 2250 is positioned within the axle 2212 (e.g., the axle, nor the axle flange 2216, etc.). Although a single spring 2250 is shown in FIG. 16, it should be understood that the suspension assembly 2210 may include any number of springs 2250 of any suitable size, shape, and/or configuration.

As shown in FIG. 16, the spring 2250 is coupled to a receiver, shown as spring worm wheel 2252, which is configured to engage (e.g., couple, mate, mesh, etc.) components of the suspension assembly 2210 (e.g., the worm shaft 2226) and rotate about an axis (e.g., a substantially vertical axis, a substantially lateral axis, another axis, etc.). According to an exemplary embodiment, the spring worm wheel 2252 is coupled (e.g., mounted, fixed, welded, molded, etc.) to the spring 2250 (e.g., at a top portion, a middle portion, a bottom portion, etc.). As discussed above, in an exemplary embodiment the spring worm wheel 2252 is of any suitable diameter (e.g., 5, 10, 15, 25, 50, 100, etc. inches) and includes any suitable number of gear teeth (e.g., 50, 100, 250, 500, 1,000, 1,500, etc.). In an exemplary embodiment, the spring worm wheel 2252 includes a large number of gear teeth, thereby providing a high gear reduction ratio (e.g., 100:1, 250:1, 500:1, etc.), for example to increase the torque output, decrease the power output requirement, increase rotational precision and/or control, etc. In an exemplary embodiment, the spring worm wheel 2252 rotates about an axis so as to selectively compress, extend, or otherwise modify the spring 2250 in the direction of an axis and/or a plurality of axes, as discussed below. In some embodiments, the spring worm wheel 2252 is coupled to other components that selectively engage the spring 2250 (e.g., a sprocket, a planetary gear, a plate, etc.) to compress, extend, or otherwise modify the spring 2250. In other embodiments, the spring worm wheel 2252 is not a spring worm wheel 2252; rather, is another suitable receiver configured to selectively modify the spring 2250, for example a planetary gear, a bevel gear, a miter gear, a pinion, is part of a gear train, etc. In yet other embodiments, the spring worm wheel 2252 is another suitable component configured to compress, extend, or otherwise modify the spring 2250 (e.g., a motorized vice, wrench, bolt and screw, etc.).

As shown in FIG. 16, the spring 2250 (e.g., the spring worm wheel 2252) is coupled to the worm shaft 2226. As discussed above, according to an exemplary embodiment spiral threads of the worm shaft 2226 are configured to couple (e.g., engage, mate, mesh, etc.) the gear teeth of the spring worm wheel 2252. The worm shaft 2226 may be of any suitable configuration (e.g., single thread, dual thread, self-locking, etc.) and include any suitable number of spiral threads (e.g. 10, 25, 50, etc.). According to an exemplary embodiment, the worm shaft 2226 is also connected to a motor (e.g., e.g., DC motor, electric motor, etc.), which is configured to drive (e.g., rotate, etc.) the worm shaft 2226 about an axis (e.g., a substantially lateral axis, a substantially vertical axis, another axis, etc.). As shown in FIG. 16, the worm shaft 2226 is substantially perpendicular to the spring worm wheel 2252. In this regard, when the worm shaft 2226 engages the spring worm wheel 2252, the motor may rotate the worm shaft 2226 about a first axis (e.g., a lateral axis, axis X, etc.), which may cause the spring worm wheel 2252 to rotate about a substantially perpendicular second axis (e.g., a vertical axis, axis Z, etc.). According to an exemplary embodiment, as the spring worm wheel 2252 rotates about the second axis (e.g., a vertical axis, axis Z, etc.), the spring worm wheel 2252 engages the spring 2250 (e.g., a coil, rotates around a coil, rotates around a plurality of coils, etc.) so as to selectively compress, extend, or otherwise modify the spring 2250 in the direction of the second axis (e.g., the vertical axis, axis Z, etc.). In some embodiments, the spring 2250 is compressed, extended, or otherwise modified in the direction of another axis (e.g., a 10 degree angle from a vertical axis, a 25 degree angle from a vertical axis, etc.), and/or a plurality of axes (e.g., 75, 70, 65, 60, etc. degree angles from a vertical axis to effectively rotate the axle 2212 and the tractive elements about a lateral axis, etc.).

In some embodiments, the worm shaft 2226 and/or the motor are positioned within the axle 2212 (e.g., the axle 2212, the axle flange 2216, etc.). In other embodiments, neither the worm shaft 2226 nor the motor are positioned within the axle 2212 (e.g., the axle 2212, nor the axle flange 2216, etc.). In some embodiments, the worm shaft 2226 is not a worm shaft; rather, is a worm gear configured to rotate the spring worm wheel 2252. In an exemplary embodiment, at least one of the spring worm wheel 2252 and the worm gear have a larger diameter and/or a larger number of gear teeth, thereby providing a high gear reduction ratio (e.g., 100:1, 250:1, 500:1, etc.). In yet other embodiments, the worm shaft 2226 is yet another suitable driver configured to rotate the spring worm wheel 2252 (and/or modify the spring 2250), for example, a bevel gear, a planetary gear, a hypoid gear, a rack, is part of a gear train, etc. In this regard, in some embodiments the worm shaft 2226 is substantially planar with the spring worm wheel 2252, and the worm shaft 2226 and spring worm wheel 2252 rotate about an axis in the same plane (e.g., a substantially lateral axis, a substantially vertical axis, another axis, etc.).

As discussed above, according to an exemplary embodiment the suspension assembly 2210 is configured to modify the position and/or orientation of the axle 2212 and tractive elements relative to the chassis (e.g., the front rail portion 30). For example, the spiral threads of the worm shaft 2226 may engage the gear teeth of the spring worm wheel 2252. A motor may drive the worm shaft 2226 to rotate the worm shaft 2226 about a first axis (e.g., a lateral axis, axis X, etc.), causing the spring worm wheel 2252 to rotate about a second axis (e.g., a vertical axis, axis Z, etc.). In some embodiments, the spring worm wheel 2252 and/or the worm shaft 2226 are configured to generate a high gear reduction ratio, for example to increase torque output, decrease the power required by the motor, increase gear rotation precision, increase control of components of the suspension assembly 2210, etc. In an exemplary embodiment, rotation of the spring worm wheel 2252 causes the spring worm wheel 2252 to engage the spring 2250. For example, as the spring worm wheel 2252 rotates, the spring worm wheel 2252 may engage the spring 2250 (e.g., a coil, rotate around a coil, rotate around a plurality of coils, etc.) so as to compress, extend, or otherwise modify the spring 2250 in the direction of the second axis (e.g., the vertical axis, axis Z, etc.). In some embodiments, the spring worm wheel 2252 may compress, extend, or otherwise modify the spring 2250 in the direction of another axis (e.g., 10 degrees from the vertical axis, etc.), and/or about a plurality of axis (e.g., 75, 70, 65, 60, etc. degree angles from the vertical axis, etc.). As the spring 2250 compresses, extends, or is otherwise modified, the spring 2250 may engage the axle flange 2216 and/or the frame rim 2214, and/or displace the axle flange 2216 and/or the frame rim 2214 in the direction of the second axis (e.g., the vertical axis, axis Z, etc.). According to an exemplary embodiment, as the axle flange 2216 and/or the frame rim 2214 is/are displaced, the axle 2212 and the tractive elements may move along and/or be positioned along a path (e.g., vertically up/down, a rotational path, maintained at a position, etc.). In this regard, the components of the suspension assembly 2210 may be configured to selectively modify and/or maintain the position and/or orientation (e.g., vertically displace, maintain position, etc.) of the axle 2212 and the tractive elements to support the vehicle 10 and/or provide additional suspension to the vehicle.

Figure 17:
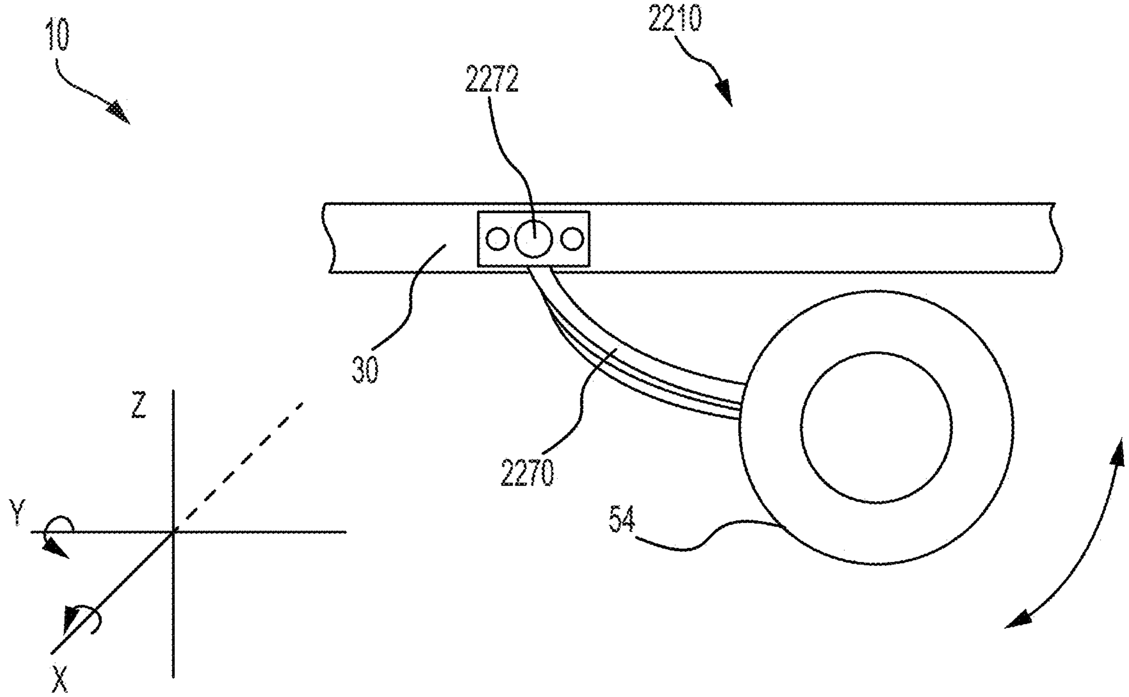
FIG. 17 is a left side view of a suspension assembly of the vehicle of FIGS. 1-8 configured as an axle suspension assembly, according to another exemplary embodiment.

According to the exemplary embodiment shown in FIG. 17, a cross-sectional side view of the suspension assembly 2210 of the vehicle 10 of FIGS. 1-8 and/or the suspension system 2200 of FIG. 12 is shown. According to an exemplary embodiment, the suspension assembly 2210 includes a deployment element, shown as leaf spring 2270, and a fastener, shown as mount 2272. In some embodiments, the suspension assembly 2210 includes additional, fewer, and/or different working components. In an exemplary embodiment, the suspension assembly 2210 is configured to modify the position and/or orientation of tractive elements relative to the chassis, as discussed below.

As shown in FIG. 17, in an exemplary embodiment the leaf spring 2270 is coupled to the chassis and tractive elements. According to an exemplary embodiment, the leaf spring 2270 is coupled to the chassis (e.g., shown as front rail portion 30) and the tractive elements (e.g., wheel and tire assemblies 54), and is configured to modify the position and/or orientation of the tractive elements relative to the chassis. In this regard, in an exemplary embodiment the leaf spring 2270 is configured to replace an axle (e.g., an independent axle, a swing axle, etc.). In some embodiments, the leaf spring 2270 is configured to engage (e.g., couple, deploy, suspend, position, support, etc.) an axle (e.g., an independent axle, a swing axle, etc.), so as to modify the position and/or orientation of the tractive elements. According to an exemplary embodiment, the leaf spring 2270 is a quarter-elliptical leaf spring. In other embodiments, the leaf spring 2270 is another suitable leaf spring (e.g., semi-elliptical, three-quarter elliptic, traverse, elliptic, etc.). In yet other embodiments, the leaf spring 2270 is another suitable spring (e.g., torsion bar, torsion spring, etc.).

As shown in FIG. 17, the leaf spring 2270 is coupled (e.g., fixed, mounted, etc.) to the chassis via the mount 2272 and/or other components (e.g., a shackle, a hanger, an eye with a bushing, bolts, plates, locknuts, etc.). As discussed above, according to an exemplary embodiment the leaf spring 2270 is coupled to a frame portion of the chassis (e.g., the front rail portions 30-32, rear rail portions 34-36, frame rim 2214, middle section 24, etc.) via the mount 2272, the tractive elements via suitable components (e.g., a hub and bearing assembly, a clamp/cam bolt, a ball joint, a rod, etc.), and/or an axle assembly (e.g., front axle 50, rear axle 52, independent axle, swing axle, etc.). As shown in FIG. 17, the leaf spring 2270 is coupled to the front rail portion 30 at a first end and the tractive elements at a second end. In some embodiments, the leaf spring 2270 is coupled to the front rail portion 30 at a first end, the tractive elements and/or an axle assembly at a middle portion, and a rail portion (e.g., front rail portion 30, middle section 24, rear rail portion 34, etc.) at a second end.

As discussed briefly above, according to an exemplary embodiment the suspension assembly 2210 is configured to modify the position and/or orientation of the tractive elements relative to the chassis (e.g., the front rail portion 30). More specifically, in an exemplary embodiment the leaf spring 2270 is configured to couple the chassis (e.g., the front rail portion 30) to the tractive elements (i.e., replace an axle). In an exemplary embodiment, the leaf spring 2270 positions the tractive elements at a specific height and/or allows for vertical displacement of the tractive elements in response to the vehicle 10 encountering uneven terrain (e.g., bumps, holes, etc.). In this regard, the leaf spring 2270 may position and/or orient the tractive elements (e.g., maintain at a specific position, allow for vertical displacement, etc.), such that the leaf spring 2270 and the tractive elements may support the vehicle 10 and/or provide suspension to the vehicle 10. In some embodiments, the leaf spring 2270 is combined with the suspension assembly 2210 described in FIGS. 12-16. For example, the leaf spring 2270 may replace the axle 2212 of FIGS. 12-16. In this regard, the elastomer torsion spring 2224 of FIGS. 13-15 may cause the leaf spring 2270 and the tractive elements to rotate about a lateral axis and move and/or position along a rotational path (e.g., vertical up/down, be maintained a position, etc.). Similarly, the spring 2250 of FIG. 16 may displace the leaf spring 2270 relative to the front rail portion 30, and cause the leaf spring 2270 and the tractive elements to move and/or position along a path (e.g., vertically up/down, a rotational path, be maintained at a position, etc.).

According to an exemplary embodiment, the suspension systems described herein may be combined in the vehicle 10 in order to provide increased space between components of the chassis, reduce stress on components of the vehicle 10, and/or provide additional support and suspension capabilities of the vehicle 10. For example, the vehicle 10 may include a plurality of suspension systems 2000 of FIGS. 9-10 at a front axle, a rear axles, a middle section, and/or another component of the vehicle 10. These laterally opposed suspension systems 2000 may provide additional space between the frame of the vehicle 10, which may be void and/or filled with other vehicle components (e.g., batteries, hydraulics, auxiliary electrical components, motors, axles, etc.). In addition, the suspension systems 2000 may allow a plurality of suspension systems 2000 (and axle assemblies, tractive elements, etc.) to be positioned adjacent to one another. The vehicle 10 may also include the suspension system 2100 of FIG. 11 at any suitable axle (front, rear, solid, independent, etc.). The suspension system 2100 may reduce the effective suspension inertia caused by an axle mounted motor assembly, which may result in increased suspension performance and/or reduced stress (e.g., forces, load, weight) on the motor, axles, and/or other components of the vehicle 10. In additional, the vehicle 10 may include the suspension system 2200 of FIGS. 12-17 at any independent, auxiliary, and/or other axles. The suspension system 2200 may be positioned longitudinally on the chassis to provide additional space between the frame of the vehicle 10, as well as, be configured to selectively modify the position and/or orientation of (e.g., selectively deploy, suspend, etc.) the axle and the tractive elements to support the vehicle 10 and/or provide additional suspension to the vehicle 10.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 as shown in the various exemplary embodiments is illustrative only. Additionally, any element disclosed in one embodiment may be incorporated or utilized with any other embodiment disclosed herein. For example, the cab 40 of the exemplary embodiment shown in at least FIG. 4 may be incorporated into the refuse vehicle 100 of the exemplary embodiment shown in at least FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An electrified vehicle, comprising:

a chassis having a frame member;

a tractive element;

a suspension assembly including a support linkage pivotally coupled to the frame member so that the support linkage is configured to pivot about a pivot point; and an axle assembly coupled to the tractive element and supported on the support linkage, wherein the axle assembly includes an axle and an electric motor that is oriented so that the electric motor extends in a direction toward the pivot point, wherein the support linkage extends from the pivot point, past the axle, and to a rear end that is arranged on a rear side of the axle, and wherein the support linkage defines a single unitary component that includes a first interface at the pivot point, a second interface at the rear end, and a unitary body that extends continuously between the first interface and the second interface.

2. The electrified vehicle of claim 1, wherein the axle is a rear axle.

3. The electrified vehicle of claim 1, wherein the axle is a front axle.

4. The electrified vehicle of claim 1, further comprising a spring coupled between the support linkage and the frame member.

5. The electrified vehicle of claim 4, wherein the electric motor is arranged between the spring and the pivot point.

6. The electrified vehicle of claim 1, wherein a center of mass of the electric motor is arranged between the axle and the pivot point.

7. The electrified vehicle of claim 1, wherein the electric motor is coupled to the axle on a side of the axle that faces the pivot point.

8. An electrified vehicle, comprising:

a chassis having a frame member;

a tractive element;

a suspension assembly including a trailing arm pivotally coupled to the frame member so that the trailing arm is configured to pivot about a lateral axis; and an axle assembly coupled to the tractive element and supported on the trailing arm, wherein the axle assembly includes an axle and an electric motor that is arranged between the axle and the lateral axis, wherein the trailing arm extends from the lateral axis, past the axle, to a rear end that is arranged on a rear side of the axle, wherein the trailing arm defines a single unitary component that includes a first interface at the frame member, a second interface at the rear end, and a unitary body that extends continuously between the first interface and the second interface.

9. The electrified vehicle of claim 8, wherein the axle is a rear axle.

10. The electrified vehicle of claim 8, further comprising a spring coupled between the trailing arm and the frame member.

11. The electrified vehicle of claim 10, wherein the electric motor is arranged between the spring and the lateral axis.

12. The electrified vehicle of claim 8, wherein a center of mass of the electric motor is arranged between the axle and the lateral axis.

13. The electrified vehicle of claim 8, wherein the electric motor is coupled to the axle on a side of the axle that faces the lateral axis.

14. An electrified vehicle, comprising:

a chassis having a frame member;

a tractive element;

a suspension assembly including a support linkage pivotally coupled to the frame member so that the support linkage is configured to pivot about a pivot point; and an axle assembly coupled to the tractive element and supported on the support linkage, wherein the axle assembly includes an axle and a motor that is coupled to the axle on a side of the axle that faces the pivot point and wherein the support linkage extends from the pivot point, past the axle, to a rear end that is arranged on a rear side of the axle, wherein the support linkage defines a single unitary component that includes a first interface at the pivot point, a second interface at the rear end, and a unitary body that extends continuously between the first interface and the second interface.

15. The electrified vehicle of claim 14, wherein the axle is a rear axle.

16. The electrified vehicle of claim 14, wherein the axle is a front axle.

17. The electrified vehicle of claim 14, further comprising a spring coupled between the support linkage and the frame member.

18. The electrified vehicle of claim 17, wherein the motor is arranged between the spring and the pivot point.

19. The electrified vehicle of claim 14, wherein a center of mass of the motor is arranged between the axle and the pivot point.

20. The electrified vehicle of claim 14, wherein the axle assembly is an e-axle.

* * * * *